(12) United States Patent
Ohtsubo et al.

(10) Patent No.: US 11,930,282 B2
(45) Date of Patent: Mar. 12, 2024

(54) CONTROL DEVICE, CONTROL METHOD, AND ELECTRONIC DEVICE TO DETERMINE A LENS POSITION

(71) Applicant: SONY GROUP CORPORATION, Tokyo (JP)

(72) Inventors: Shinichi Ohtsubo, Kanagawa (JP); Takeshi Akabane, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/175,621

(22) Filed: Feb. 28, 2023

(65) Prior Publication Data

US 2023/0209214 A1 Jun. 29, 2023

Related U.S. Application Data

(63) Continuation of application No. 16/869,162, filed on May 7, 2020, now Pat. No. 11,606,495, which is a (Continued)

(30) Foreign Application Priority Data

Jul. 31, 2015 (JP) .................................. 2015-151644

(51) Int. Cl.
*H04N 23/80* (2023.01)
*G02B 7/28* (2021.01)
(Continued)

(52) U.S. Cl.
CPC ............. *H04N 23/80* (2023.01); *G02B 7/285* (2013.01); *G02B 7/34* (2013.01); *G02B 7/36* (2013.01);
(Continued)

(58) Field of Classification Search
CPC . G02B 7/285; G02B 7/34; G02B 7/36; G03B 13/36; H04N 5/232122;
(Continued)

(56) References Cited

U.S. PATENT DOCUMENTS 5,258,801 A * 11/1993 Kusaka .................... G02B 7/34
396/123
5,410,383 A 4/1995 Kusaka et al.
(Continued)

FOREIGN PATENT DOCUMENTS

EP 379808 A1 8/1990
JP 63-194240 A 8/1988
(Continued)

OTHER PUBLICATIONS

Office Action for JP Patent Application No. 2021-001683, dated Jul. 26, 2022, 02 pages of English Translation and 02 pages of Office Action.
(Continued)

*Primary Examiner* — Amy R Hsu
(74) *Attorney, Agent, or Firm* — CHIP LAW GROUP

(57) ABSTRACT

Provided is a control device that includes a calculation unit that calculates, on a basis of a result of capturing a subject image passed through a focus lens by using an imaging element including a plurality of phase difference detection regions, a focus position of each of the phase difference detection regions and a determination unit that determines a position of the focus lens on a basis of an average value of the focus positions of the phase difference detection regions calculated by the calculation unit and falling within a predetermined range from the focus position on an infinity side or macro side.

9 Claims, 23 Drawing Sheets

Related U.S. Application Data continuation of application No. 15/745,563, filed as application No. PCT/JP2016/067290 on Jun. 9, 2016, now Pat. No. 10,681,265.

(51) Int. Cl.

| | | |
|---|---|---|
| G02B 7/34 | (2021.01) | |
| G02B 7/36 | (2021.01) | |
| G03B 13/36 | (2021.01) | |
| H04N 23/10 | (2023.01) | |
| H04N 23/67 | (2023.01) | |
| H04N 23/75 | (2023.01) | |
| H04N 25/13 | (2023.01) | |
| H04N 25/704 | (2023.01) | |

(52) U.S. Cl.
CPC ............ *G03B 13/36* (2013.01); *H04N 23/10* (2023.01); *H04N 23/672* (2023.01); *H04N 23/673* (2023.01); *H04N 23/75* (2023.01); *H04N 25/704* (2023.01); *H04N 25/134* (2023.01)

(58) Field of Classification Search
CPC ......... H04N 5/232123; H04N 5/23229; H04N 5/238; H04N 5/36961; H04N 9/045; H04N 9/04557
See application file for complete search history.

(56) References Cited

U.S. PATENT DOCUMENTS

| | | | | |
|---|---|---|---|---|
| 6,112,029 | A | 8/2000 | Suda | |
| 7,221,805 | B1 * | 5/2007 | Bachelder | G03B 13/36 |
| | | | | 396/77 |
| 8,718,459 | B2 | 5/2014 | Hsu | |
| 8,730,380 | B2 * | 5/2014 | Uchida | G03B 13/36 |
| | | | | 348/349 |
| 9,215,389 | B2 * | 12/2015 | Usui | H04N 23/673 |
| 9,462,252 | B2 | 10/2016 | Aoki et al. | |
| 9,742,985 | B2 | 8/2017 | Yokozeki | |
| 10,708,487 | B2 * | 7/2020 | Liu | H04N 23/672 |
| 2016/0044233 | A1 * | 2/2016 | Nakagawa | H04N 23/675 |
| | | | | 348/207.11 |
| 2018/0063415 | A1 | 3/2018 | Hongu | |
| 2018/0210318 | A1 * | 7/2018 | Sakurabu | G03B 13/36 |

FOREIGN PATENT DOCUMENTS

| | | |
|---|---|---|
| JP | 02-178641 A | 7/1990 |
| JP | 09-081632 A | 3/1997 |
| JP | H10142490 A | 5/1998 |
| JP | 2010-049209 A | 3/2010 |
| JP | 2010-250001 A | 11/2010 |
| JP | 2011-085690 A | 4/2011 |
| JP | 2012-509534 A | 4/2012 |
| JP | 2013-015559 A | 1/2013 |
| JP | 2013-029803 A | 2/2013 |
| JP | 2013-160991 A | 8/2013 |
| JP | 2014228671 A | 12/2014 |
| JP | 2016-224372 A | 12/2016 |
| WO | 2015/107745 A1 | 7/2015 |

OTHER PUBLICATIONS

Office Action for JP Patent Application No. 2021-001683, dated Feb. 8, 2022, 02 pages of English Translation and 03 pages of Office Action.

Office Action for JP Patent Application No. 2017-532415, dated Mar. 3, 2020, 03 pages of English Translation and 04 pages of Office Action.

Office Action for JP Patent Application No. 2020-123310, dated Nov. 2, 2021, 02 pages of English Translation and 02 pages of Office Action.

Yusuke Kajiwara, "The temper prediction system using the biological information and the weather intelligence for and prevention of a disease" vol. 135, Journal of the Institute of Electrical Engineers of Japan C, Japan, Jun. 1, 2015, pp. 570-579.

Kiyohisa Taguchi, "visualization of spatiotemporal distribution of popular rich feeling", Japan, Information Processing Society of Japan, vol. 2014-HCI-157, Mar. 6, 2014, 08 pages.

International Search Report and Written Opinion of PCT Application No. PCT/JP2016/067290, dated Aug. 30, 2016, 15 pages of English Translation and 13 pages of ISRWO.

International Preliminary Report on Patentability of PCT Application No. PCT/JP2016/067290, dated Feb. 15, 2018, 12 pages of English Translation and 07 pages of IPRP.

Non-Final Office Action for U.S. Appl. No. 15/745,563, dated Apr. 19, 2019, 15 pages.

Final Office Action for U.S. Appl. No. 15/745,563, dated Oct. 31, 2019, 09 pages.

Notice of Allowance for U.S. Appl. No. 15/745,563, dated Feb. 10, 2020, 09 pages.

Non-Final Office Action for U.S. Appl. No. 16/869,162, dated Mar. 1, 2022, 10 pages.

Final Office Action for U.S. Appl. No. 16/869,162, dated Aug. 30, 2022, 07 pages.

Notice of Allowance for U.S. Appl. No. 16/869,162, dated Nov. 10, 2022, 10 pages.

\* cited by examiner

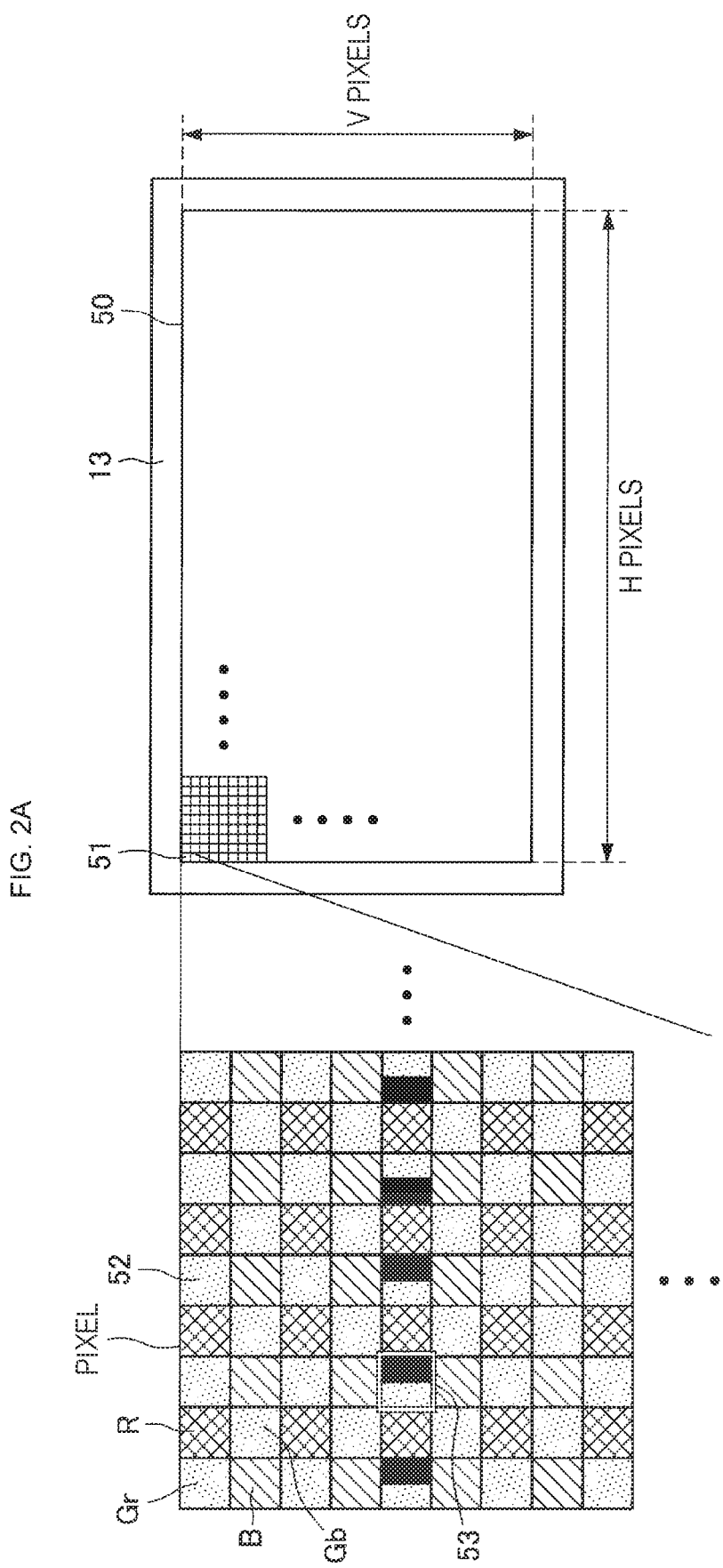

FIG. 2B
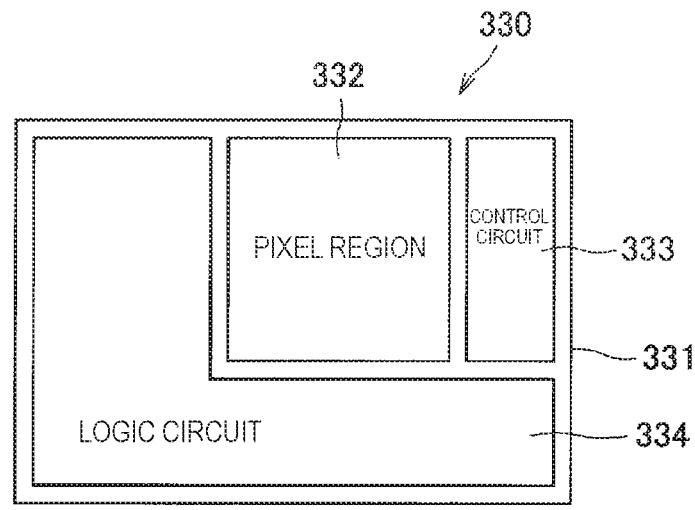
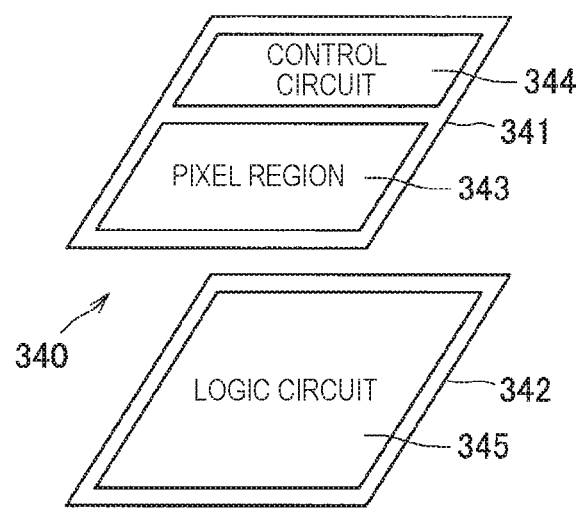
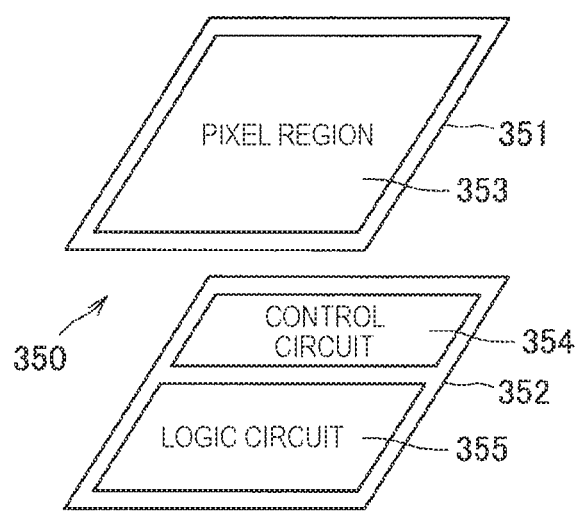

CONTROL DEVICE, CONTROL METHOD, AND ELECTRONIC DEVICE TO DETERMINE A LENS POSITION

CROSS REFERENCE TO RELATED APPLICATIONS

The present application is a continuation application of U.S. patent application Ser. No. 16/869,162, filed on May 7, 2020, which is a continuation application of U.S. patent application Ser. No. 15/745,563, filed on Jan. 17, 2018, which is a U.S. National Phase of International Patent Application No. PCT/JP2016/067290 filed on Jun. 9, 2016, which claims priority benefit of Japanese Patent Application No. JP 2015-151644 filed in the Japan Patent Office on Jul. 31, 2015, the entire content of which is hereby incorporated by reference.

TECHNICAL FIELD

The present disclosure relates to a control device, a control method, a computer program, and an electronic device.

BACKGROUND ART

With regard to an image capturing device, a method for realizing autofocus (AF) that performs focusing on a subject at a high speed by embedding pixels for detecting a phase difference in an imaging element has been widespread in recent years. Such AF is referred to as "AF based on phase difference detection method".

CITATION LIST

Patent Literature

Patent Literature 1:
JP 2010-49209A

DISCLOSURE OF INVENTION

Technical Problem

However, when a subject close to an image capturing device and a subject far from the image capturing device simultaneously exist in a region for detecting a phase difference between subject images, neither of the subjects can be in focus in principle in the AF based on the phase difference detection method.

In view of this, the present disclosure proposes a control device, a control method, a computer program, and an electronic device, each of which is new, is improved, and is capable of effectively determining a lens position even in a case where a subject close to an image capturing device and a subject far from the image capturing device simultaneously exist in a region for detecting a phase difference between subject images.

Solution to Problem

According to the present disclosure, there is provided a control device including: a calculation unit configured to calculate, on a basis of a result of capturing a subject image passed through a focus lens by using an imaging element including a plurality of phase difference detection regions, a focus position of each of the phase difference detection regions; and a determination unit configured to determine a position of the focus lens on a basis of an average value of the focus positions of the phase difference detection regions calculated by the calculation unit and falling within a predetermined range from the focus position on an infinity side or macro side.

In addition, according to the present disclosure, there is provided a control device including: a calculation unit configured to calculate, on a basis of a result of capturing a subject image passed through a focus lens by using an imaging element including a plurality of phase difference detection regions, a focus position of each of the phase difference detection regions; and a determination unit configured to determine a position of the focus lens on a basis of the focus position on an infinity side or macro side if a number of the phase difference detection regions whose focus positions are apart from the focus position of the phase difference detection region serving as a reference by a predetermined range or more, is a predetermined value or more.

In addition, according to the present disclosure, there is provided a control device including: a calculation unit configured to calculate, on a basis of a result of capturing a subject image passed through a focus lens by using an imaging element including a plurality of phase difference detection regions, a focus position of each of the phase difference detection regions and convert the focus positions into a histogram; and a determination unit configured to determine a position of the focus lens on a basis of the focus position on an infinity side or macro side in a case where each of the focus positions of the phase difference detection regions converted into the histogram satisfies a first predetermined condition.

In addition, according to the present disclosure, there is provided a control method including: calculating, on a basis of a result of capturing a subject image passed through a focus lens by using an imaging element including a plurality of phase difference detection regions, a focus position of each of the phase difference detection regions; and determining a position of the focus lens on a basis of an average value of the calculated focus positions of the phase difference detection regions falling within a predetermined range from the focus position on an infinity side or macro side.

In addition, according to the present disclosure, there is provided a control method including: calculating, on a basis of a result of capturing a subject image passed through a focus lens by using an imaging element including a plurality of phase difference detection regions, a focus position of each of the phase difference detection regions; and determining a position of the focus lens on a basis of the focus position on an infinity side or macro side if a number of the phase difference detection regions whose focus positions are apart from the focus position in the phase difference detection region serving as a reference by a predetermined range or more, is a predetermined value or more.

In addition, according to the present disclosure, there is provided a control method including: calculating, on a basis of a result of capturing a subject image passed through a focus lens by using an imaging element including a plurality of phase difference detection regions, a focus position of each of the phase difference detection regions and converting the focus positions into a histogram; and determining a position of the focus lens on a basis of the focus position on an infinity side or macro side in a case where each of the focus positions of the phase difference detection regions converted into the histogram satisfies a first predetermined condition.

In addition, according to the present disclosure, there is provided a computer program for causing a computer execute calculating, on a basis of a result of capturing a subject image passed through a focus lens by using an imaging element including a plurality of phase difference detection regions, a focus position of each of the phase difference detection regions, and determining a position of the focus lens on a basis of an average value of the calculated focus positions of the phase difference detection regions falling within a predetermined range from the focus position on an infinity side or macro side.

In addition, according to the present disclosure, there is provided a computer program for causing a computer execute calculating, on a basis of a result of capturing a subject image passed through a focus lens by using an imaging element including a plurality of phase difference detection regions, a focus position of each of the phase difference detection regions, and determining a position of the focus lens on a basis of the focus position on an infinity side or macro side if a number of the phase difference detection regions whose focus positions are apart from the focus position in the phase difference detection region serving as a reference by a predetermined range or more, is a predetermined value or more.

In addition, according to the present disclosure, there is provided a computer program for causing a computer execute calculating, on a basis of a result of capturing a subject image passed through a focus lens by using an imaging element including a plurality of phase difference detection regions, a focus position of each of the phase difference detection regions and converting the focus positions into a histogram, and determining a position of the focus lens on a basis of the focus position on an infinity side or macro side in a case where each of the focus positions of the phase difference detection regions converted into the histogram satisfies a first predetermined condition.

In addition, according to the present disclosure, there is provided an electronic device including: an imaging optical system configured to collect light; an imaging element configured to receive light from the imaging optical system and capture an image; and a signal processing unit configured to process a signal output by the imaging element. The signal processing unit includes a calculation unit configured to calculate, on a basis of a result of capturing a subject image passed through a focus lens by using the imaging element including a plurality of phase difference detection regions, a focus position of each of the phase difference detection regions, and a determination unit configured to determine a position of the focus lens on a basis of an average value of the focus positions of the phase difference detection regions calculated by the calculation unit and falling within a predetermined range from the focus position on an infinity side or macro side.

Advantageous Effects of Invention

As described above, according to the present disclosure, it is possible to provide a control device, a control method, a computer program, and an electronic device, each of which is new, is improved, and is capable of effectively determining a lens position even in a case where a subject close to an image capturing device and a subject far from the image capturing device simultaneously exist in a region for detecting a phase difference between subject images.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2A is a plan view illustrating a configuration example of an image sensor 13 seen from an imaging optical system 11A side.

FIG. 2B is a diagram illustrating a basic schematic configuration of a solid-state image capturing device including an image sensor 13 according to the present technology.

MODE(S) FOR CARRYING OUT THE INVENTION

Figure 1:
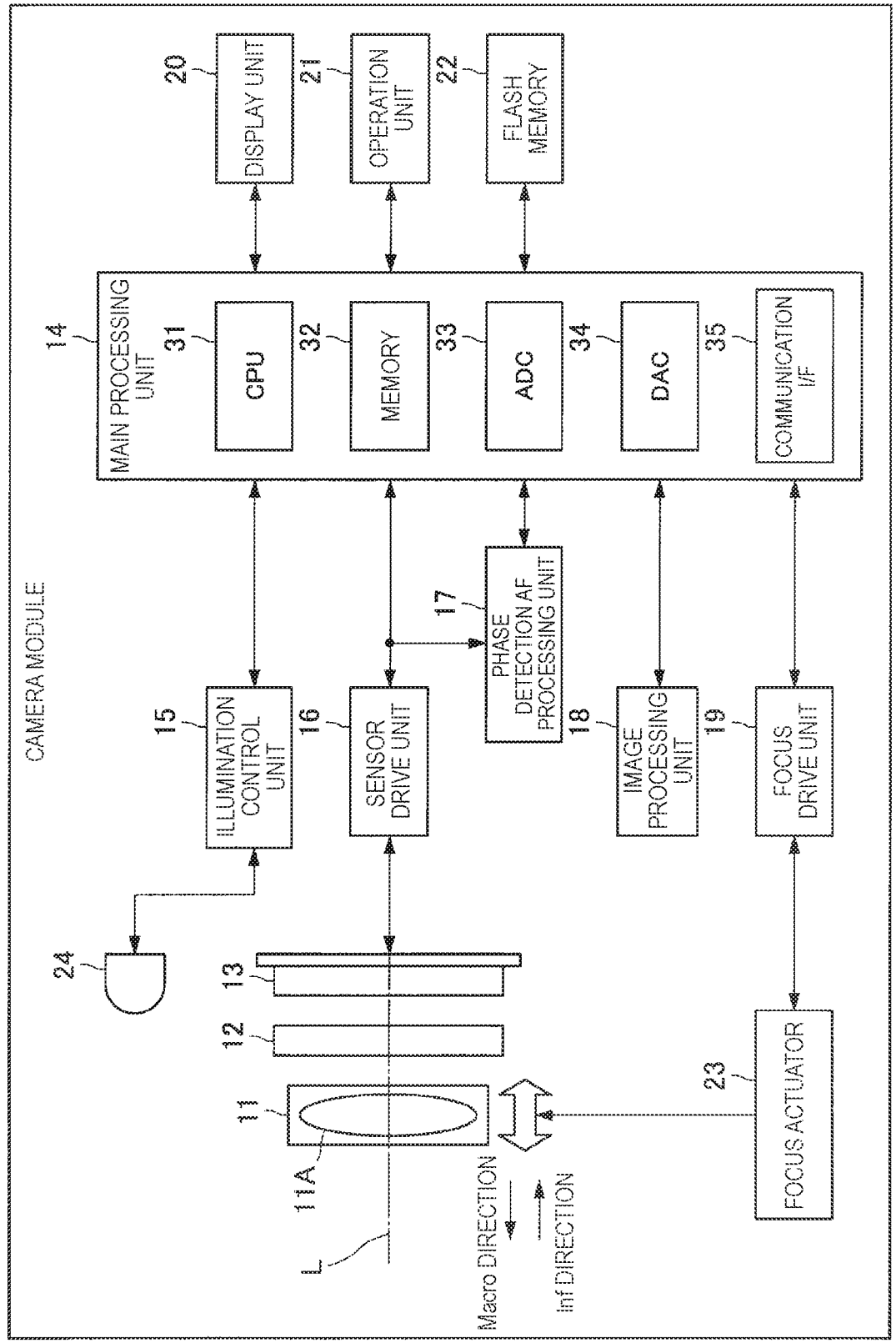
FIG. 1 is a block diagram illustrating a configuration example of an embodiment of a camera module to which the present technology is applied.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Embodiment of present disclosure
1.1. Configuration example
1.2. Operation examples
2. Conclusion

1. EMBODIMENT OF PRESENT DISCLOSURE

1.1. Configuration Example of Camera Module

First, a schematic configuration of a camera module according to an embodiment of the present disclosure will be described with reference to FIG. 1.

FIG. 1 is a block diagram illustrating a configuration example of an embodiment of a camera module to which the present technology is applied.

In FIG. 1, a camera module includes a lens barrel 11, an optical filter 12, an image sensor 13, a main processing unit 14, an illumination control unit 15, a sensor drive unit 16, a phase detection AF processing unit 17, an image processing unit 18, a focus drive unit 19, a display unit 20, an operation unit 21, a flash memory 22, a focus actuator 23, and an illumination unit 24.

Note that, in FIG. 1, the camera module is integrally configured with the lens barrel 11. However, the camera module can be configured so that the lens barrel 11 is removable.

The lens barrel 11 includes an imaging optical system 11A such as a lens group and a diaphragm and collects light incident thereon on the image sensor 13 via the optical filter 12.

Note that a lens position (in other words, a focus position) of the lens group of the imaging optical system 11A is movable in an optical axis L direction. With this, it is possible to adjust a focus.

The optical filter 12 is an optical element for reducing false color and moire generated in an image taken by the image sensor 13. That is, the optical filter 12 is an optical low-pass filter, and a part of components of light from the imaging optical system 11A is attenuated and is emitted toward the image sensor 13.

The image sensor 13 is an imaging element that takes an image by receiving light (subject light) incident from the imaging optical system 11A via the optical filter 12. It is possible to employ, for example, a complementary metal oxide semiconductor (CMOS) image sensor as the image sensor 13.

The image sensor 13 supplies (image signals of) the image taken by capturing an image to the sensor drive unit 16.

The main processing unit 14 controls each block included in the camera module.

The main processing unit 14 includes a central processing unit (CPU) 31, a memory 32, an analog to digital converter (ADC) 33, a digital to analog converter (DAC) 34, and a communication interface (I/F) 35.

The CPU 31 controls the illumination control unit 15, the flash memory 22, or the like by executing programs stored on the memory 32, thereby causing various kinds of processing to be executed such as AF, taking an image, various kinds of image processing, and recording a taken image.

The memory 32 includes a volatile memory such as a random access memory (RAM), a nonvolatile memory such as an electrically erasable programmable read only memory (EEPROM), or the like and stores the programs to be executed by the CPU 31 and data necessary to operate the CPU 31.

The data stored on the memory 32 is, for example, an AF parameter for phase detection AF described below.

The ADC 33 performs AD conversion from an analog signal into a digital signal. The DAC 34 performs DA conversion from a digital signal into an analog signal. The communication I/F 35 controls communication with the Internet or the like.

The illumination control unit 15 performs control so that the illumination unit 24 emits light serving as light with which a subject is illuminated and torch auxiliary light for AF.

That is, the illumination control unit 15 causes the illumination unit 24 to emit (turn on) an electronic flash serving as light with which a subject is illuminated, in synchronization with image taking operation of the image sensor 13. Further, the illumination control unit 15 causes the illumination unit 24 to emit torch auxiliary light in synchronization with AF operation.

The sensor drive unit 16 performs control so that the image sensor 13 takes an image. Further, the sensor drive unit 16 performs AD conversion of image signals of the image taken by the image sensor 13 as necessary and supplies the image signals to the main processing unit 14 and the phase detection AF processing unit 17.

The phase detection AF processing unit 17 calculates a lens moving amount for moving the lens position of (the lens group of) the imaging optical system 11A by the phase detection AF by using pixel values of detection pixels described below among the image signals of the taken image from the sensor drive unit 16 and supplies the lens moving amount to the main processing unit 14.

The image processing unit 18 performs image processing, such as γ conversion, color interpolation, and compression/expansion using a predetermined compression/expansion method such as the joint photographic experts group (JPEG), with respect to the image taken by the image sensor 13 and supplied via the sensor drive unit 16 and the main processing unit 14. Further, the image processing unit 18 calculates a contrast evaluation value indicating a contrast of the taken image and supplies the contrast evaluation value to the main processing unit 14. In the main processing unit 14, (control of) contrast detection AF is performed by using the contrast evaluation value from the image processing unit 18.

The focus drive unit 19 drives the focus actuator 23 in accordance with control by the main processing unit 14 and moves the lens position of the imaging optical system 11A in the optical axis L direction, thereby adjusting a focus.

The display unit 20 includes, for example, a liquid crystal display (LCD) panel and displays information regarding an image-taking mode of the camera module, a preview image before taking an image, an image for checking after taking an image, an image in a focused state at the time of AF, and the like.

The operation unit 21 is a switch group to be operated by a user and includes a power supply switch, a release (image-taking trigger) switch, a zoom operation switch, an image-taking mode selection switch, and the like.

The flash memory 22 is detachable from the camera module. A taken image supplied from the main processing unit 14 is recorded (stored) on the flash memory 22.

The focus actuator 23 is driven by the focus drive unit 19 and moves the lens position of the imaging optical system 11A in the optical axis L direction.

The illumination unit 24 emits light serving as light with which a subject is illuminated and torch auxiliary light for AF in accordance with control by the illumination control unit 15.

As the illumination unit 24, it is possible to employ, for example, a flash illumination device using a xenon tube, an LED illumination device including a light emitting diode (LED) capable of continuously emitting light, or the like. In a case where the camera module is mounted on a portable device such as a smartphone, it is possible to employ a comparatively small LED illumination device as the illumination unit 24.

The illumination unit 24 emits light toward a field via a light emitter lens (not illustrated) in which a groove of a predetermined pattern is formed, thereby improving accuracy of AF with respect to a dark subject and a low-contrast subject.

Note that the phase detection AF processing unit 17 can be included (provided) in the image sensor 13.

Further, the phase detection AF processing unit 17 can be realized by hardware or can also be realized by software. In a case where the phase detection AF processing unit 17 is realized by software, for example, programs included in the software are installed in a computer such as the main processing unit 14 and are executed by the CPU 31 of the main processing unit 14.

In this case, processing that the CPU 31 performs in accordance with the programs is not necessarily performed in time series in the order shown as flowcharts described below. That is, the processing that the CPU 31 performs in accordance with the programs also includes processing executed in parallel or individually (for example, parallel processing or processing to be performed by object).

Herein, the programs can be recorded in advance on the memory 32 serving as a recording medium provided in the main processing unit 14 serving as a computer.

Alternatively, the programs can be stored (recorded) on, for example, the flash memory 22 that is a removable recording medium and be provided as so-called packaged software.

Note that the programs can be installed not only in the main processing unit 14 from the flash memory 22 but also in the memory 32 provided therein by being downloaded into the main processing unit 14 via a communication network such as the Internet or a broadcast network such as terrestrial broadcasting.

Next, a configuration example of the image sensor 13 will be described. FIG. 2A is a plan view illustrating a configuration example of the image sensor 13 seen from the imaging optical system 11A side.

The image sensor 13 has a light receiving surface 50 that receives light, and the light receiving surface 50 includes H×V number of pixels (H represents the number of pixels lined up in a horizontal row and V represents the number of pixels lined up in a vertical column).

Herein, in the present embodiment, when the light receiving surface 50 is divided into, for example, rectangular blocks each of which serves as a pixel group including a plurality of pixels, the block is also referred to as "pixel block 51".

FIG. 2A illustrates 9×9 pixels as a part of pixel groups included in the pixel block 51.

For example, (primary color) color filters of red (R), green (G), and blue (B) in a Bayer array are provided on the pixels in an on-chip manner.

Herein, the pixels on which the color filters of R, G, and B are provided are referred to as an R pixel, a G pixel, and a B pixel, respectively. The R pixel, the G pixel, and the B pixel have spectral sensitivities of R, G, and B light, respectively, because of the on-chip color filters. In the Bayer array, 2×2 pixels (2×2 means horizontal row×vertical column) are considered to be a basic unit, and G pixels are arranged in diagonal positions and an R pixel and a B pixel are arranged in the remaining two positions.

In FIG. 2A, in 2×2 pixels considered to be a basic unit, for example, the R pixel is arranged in an upper right position, the B pixel is arranged in a lower left position, and the G pixels are arranged in an upper left position and a lower right position.

In the Bayer array, the above basic unit is repeatedly arranged horizontally and vertically.

Note that, in FIG. 2A, the G pixel in the upper left position of the basic unit is denoted by Gr, and the G pixel in the lower right position thereof is denoted by Gb.

The light receiving surface 50 includes detection pixels 53 for detecting a phase difference to be used for the phase detection AF and normal pixels (pixels used for the purpose of obtaining an image to serve as a taken image) 52 that are other than the detection pixels 53 and are not used to detect a phase difference.

Although details of the detection pixels 53 will be described below, left half portions or right half portions of the detection pixels 53 are shielded in order to receive, for example, light passed through a right half portion or left half portion serving as different regions of an exit pupil of the imaging optical system 11A.

Note that, regarding a taken image, a main component of luminance is acquired on the basis of pixel values of the G pixels.

Next, a basic schematic configuration of a solid-state image capturing device including the image sensor 13 according to the present technology will be described with reference to FIG. 2B.

As a first example, a solid-state image capturing device 330 illustrated in an upper part of FIG. 2B includes a pixel region 332, a control circuit 333, and a logic circuit 334 including the sensor drive unit 16, phase detection AF processing unit 17, and the like on a single semiconductor chip 331.

As a second example, a solid-state image capturing device 340 illustrated in a middle part of FIG. 2B includes a first semiconductor chip unit 341 and a second semiconductor chip unit 342. A pixel region 343 and a control circuit 344 are mounted on the first semiconductor chip unit 341, and a logic circuit 345 including the above-described sensor drive unit 16, phase detection AF processing unit 17, and the like is mounted on the second semiconductor chip unit 342. Then, the solid-state image capturing device 340 serving as a single semiconductor chip is configured by electrically connecting the first semiconductor chip unit 341 and the second semiconductor chip unit 342 with each other.

As a third example, a solid-state image capturing device 350 illustrated in a lower part of FIG. 2B includes a first semiconductor chip unit 351 and a second semiconductor chip unit 352. A pixel region 353 is mounted on the first semiconductor chip unit 351, and a control circuit 354 and a logic circuit 355 including the above-described sensor drive unit 16, phase detection AF processing unit 17, and the like are mounted on the second semiconductor chip unit 352. Then, the solid-state image capturing device 350 serving as a single semiconductor chip is configured by electrically connecting the first semiconductor chip unit 351 and the second semiconductor chip unit 352 with each other.

Figure 3A:
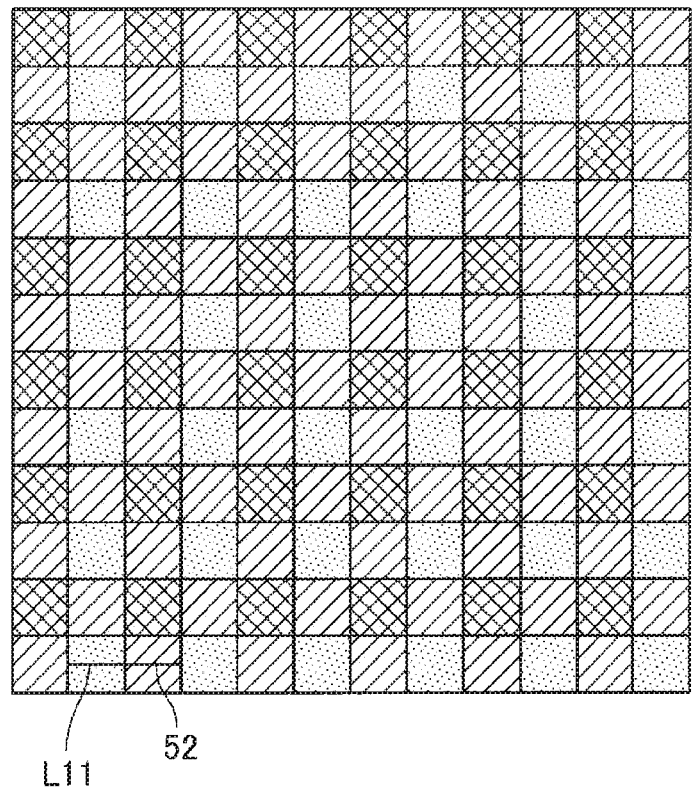
FIGS. 3A and 3B are diagrams illustrating a configuration example of normal pixels 52.
Figure 3B:
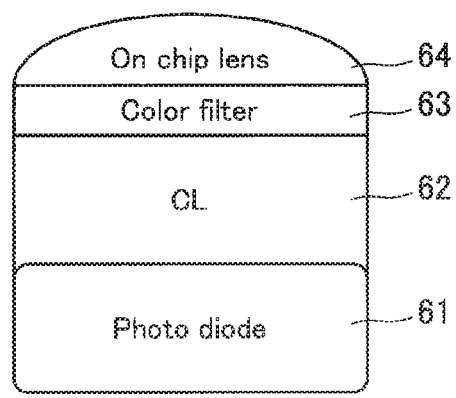

Next, a configuration example of pixels will be described. FIGS. 3A and 3B are diagrams illustrating a configuration example of the normal pixels 52.

FIG. 3A is a plan view illustrating a configuration example of a region only including the normal pixels 52 in the light receiving surface 50.

FIG. 3B is a cross-sectional view schematically illustrating a cross-section of the normal pixel 52 taken along a line segment L11 of FIG. 3A.

The normal pixel 52 is configured so that a photo diode (PD) 61, a contact layer (CL) 62, a color filter 63, and an on-chip lens (microlens) 64 are laminated from the bottom in FIGS. 3A and 3B.

In the normal pixel 52, among light incident on the on-chip lens 64, light having a predetermined color component passes through the color filter 63 and is incident on the PD 61 via the transparent CL 42. In the PD 61, incident light is received and is subjected to photoelectric conversion. An electric signal obtained as a result of the photoelectric conversion in the PD 61 is output as a pixel value of the normal pixel 52.

Figure 4A:
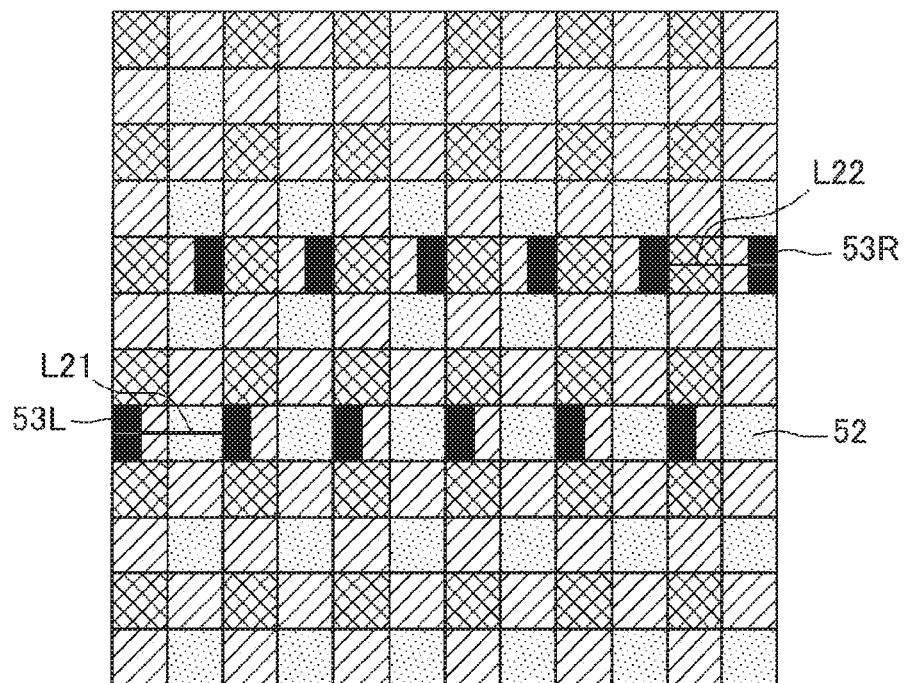
FIGS. 4A, 4B, and 4C are diagrams illustrating a configuration example of detection pixels 53.
Figures 4B, 4C:
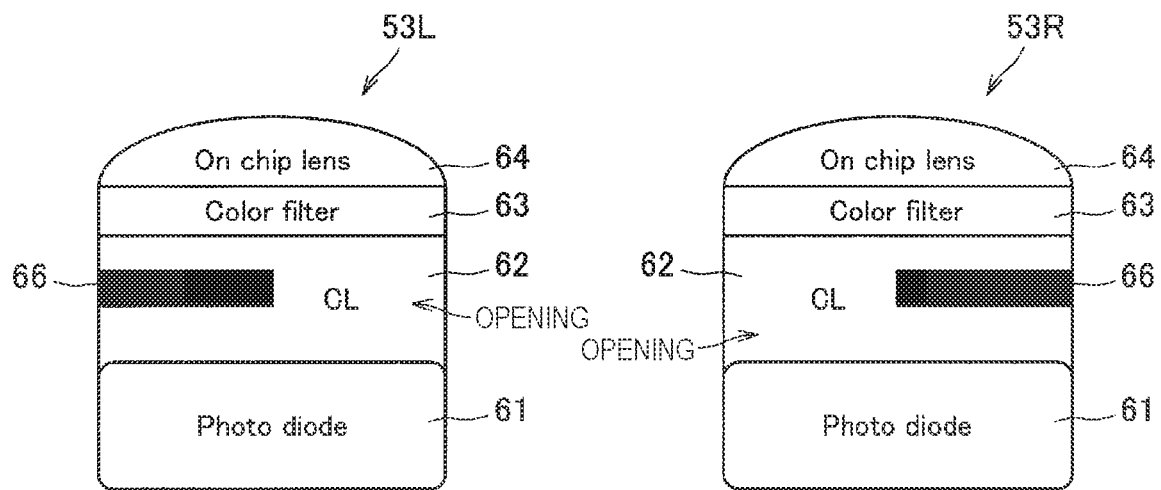

FIGS. 4A, 4B, and 4C are diagrams illustrating a configuration example of the detection pixels 53.

FIG. 4A is a plan view illustrating a configuration example of a region including the detection pixels 53 in the light receiving surface 50.

In FIGS. 4A, 4B, and 4C, among R pixels, G pixels, and B pixels of the light receiving surface 50, some G pixels serve as the detection pixels 53. Note that, instead of the G pixels, some R pixels or some B pixels can be employed as the detection pixels.

The detection pixels 53 includes left light-shielding pixels 53L whose left half portion shields light and right light-shielding pixels 53R whose right half portion shields light in order to, for example, receive light passed through the right half portion or left half portion serving as the different regions of the exit pupil of the imaging optical system 11A.

In order to detect a phase difference between two images obtained by splitting the exit pupil of the imaging optical system 11A, the left light-shielding pixel 53L and the right light-shielding pixel 53R are paired.

FIG. 4B is a cross-sectional view schematically illustrating a cross-section of the left light-shielding pixel 53L among the detection pixels 53 taken along a line segment L21 of FIG. 4A.

FIG. 4C is a cross-sectional view schematically illustrating a cross-section of the right light-shielding pixel 53R among the detection pixels 53 taken along a line segment L22 of FIG. 4A.

Note that structural elements in the detection pixel 53 in FIGS. 4A, 4B, and 4C, which are configured in the same way as the normal pixel 52 in FIGS. 3A and 3B, are denoted by the reference signs same as the structural elements in the normal pixel 52, and, hereinafter, description thereof will be omitted as appropriate.

The detection pixel 53 is similar to the normal pixel 52 in that the PD 61 to the on-chip lens 64 are included. However, the detection pixel 53 is different from the detection pixel 53 in that a light-shielding film 66 is provided in the CL 62.

In the left light-shielding pixel 53L among the detection pixels 53, as illustrated in FIG. 4B, the light-shielding film 66 is provided to shield light incident on the left half portion of the left light-shielding pixel 53L. With this, in the left light-shielding pixel 53L, only the right half portion from the center of the on-chip lens 64, which is seen from the on-chip lens 64 side, is opened. As a result, for example, light passed through the right half portion of the exit pupil of the imaging optical system 11A is received by the left light-shielding pixel 53L.

In the right light-shielding pixel 53R among the detection pixels 53, as illustrated in FIG. 4C, the light-shielding film 66 is provided to shield light incident on the right half portion of the right light-shielding pixel 53R. With this, in the right light-shielding pixel 53R, only the left half portion from the center of the on-chip lens 64, which is seen from the on-chip lens 64 side, is opened. As a result, for example, light passed through the left half portion of the exit pupil of the imaging optical system 11A is received by the right light-shielding pixel 53R.

Pupil split of the exit pupil of the imaging optical system 11A in a horizontal direction (lateral direction) is performed by the above described pair of the left light-shielding pixel 53L and the right light-shielding pixel 53R.

Note that the detection pixels 53 are regularly arranged over the whole light receiving surface 50 in, for example, the horizontal direction. If the number of detection pixels 53 is increased, a phase difference, more specifically, accuracy of the phase detection AF, is improved. However, an image quality of a taken image is deteriorated. Therefore, it is possible to determine the number of detection pixels 53 and arrangement positions thereof in consideration of a trade-off between accuracy of the phase detection AF and an image quality of a taken image.

Further, an arrangement pattern of the detection pixels 53 can be fixed or can be different depending on, for example, a position such as a center portion or a peripheral portion of the light receiving surface 50.

Figure 5:
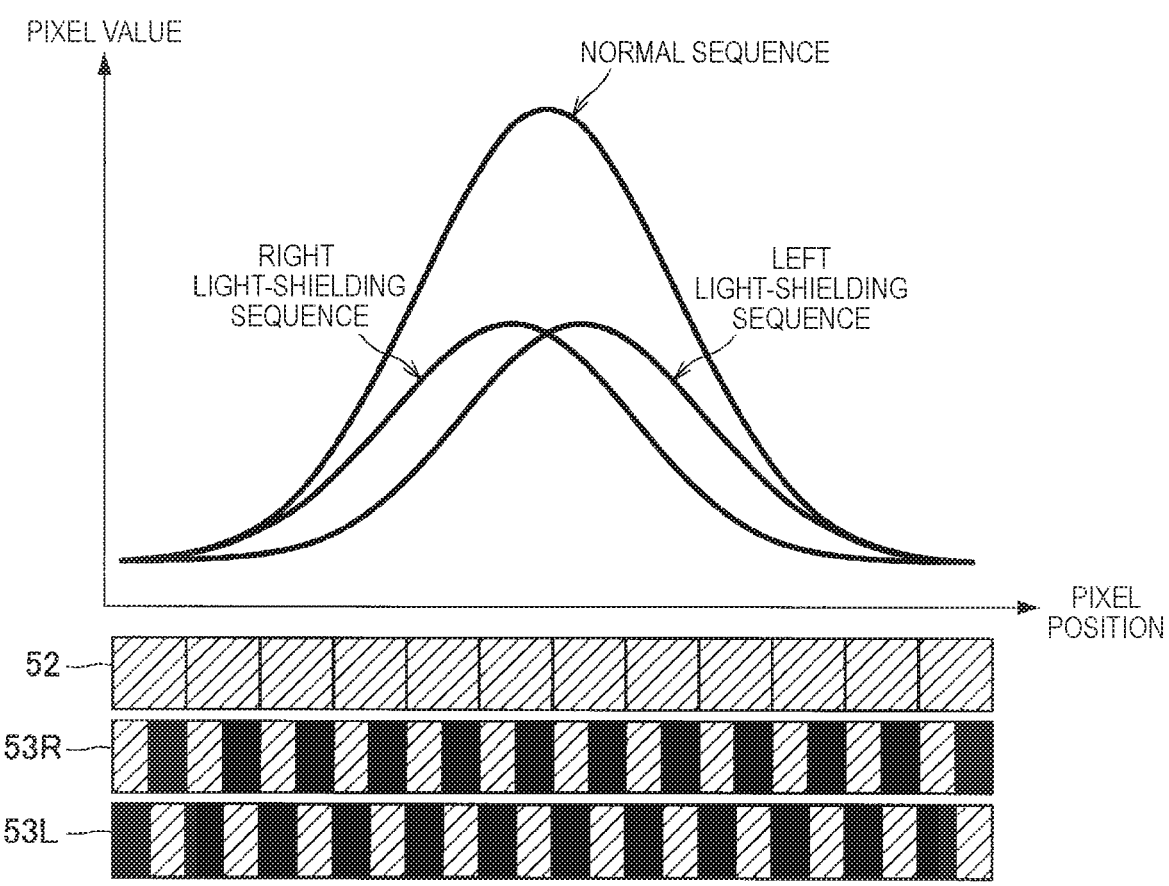
FIG. 5 is a diagram illustrating examples of sequences of pixel values of normal pixels 52, left light-shielding pixels 53L, and right light-shielding pixels 53R.

FIG. 5 is a diagram illustrating examples of sequences of pixel values of the normal pixels 52, the left light-shielding pixels 53L, and the right light-shielding pixels 53R.

Herein, a sequence of pixel values of the normal pixels 52 arranged in a line (horizontal line) is also referred to as "normal sequence". Further, a sequence of pixel values of the left light-shielding pixels 53L arranged in a line is also referred to as "left light-shielding sequence", and a sequence of pixel values of the right light-shielding pixels 53R in a line is also referred to as "right light-shielding sequence".

FIG. 5 illustrates a normal sequence and a right light-shielding sequence obtained from a line in which the normal pixels 52 and the right light-shielding pixels 53R coexist, and a left light-shielding sequence obtained from a line in which the left light-shielding pixels 53L paired with the right light-shielding pixels 53R exist.

In FIG. 5, a horizontal axis shows a position of a pixel and a vertical axis shows a pixel value (brightness).

A subject image appearing as the normal sequence is separated by the detection pixels 53 (left light-shielding pixels 53L and right light-shielding pixels 53R) into an image appearing as the left light-shielding sequence (hereinafter, also referred to as "left light-shielding image") and an image appearing as the right light-shielding sequence (hereinafter, also referred to as "right light-shielding image").

When detecting a phase difference showing a relative positional relationship between left light-shielding image and right light-shielding image by, for example, performing correlation operation of the left light-shielding image and the right light-shielding image, it is possible to detect, on the basis of the phase difference, a defocus amount that is a shift amount of a focus of the subject image.

Figure 6:
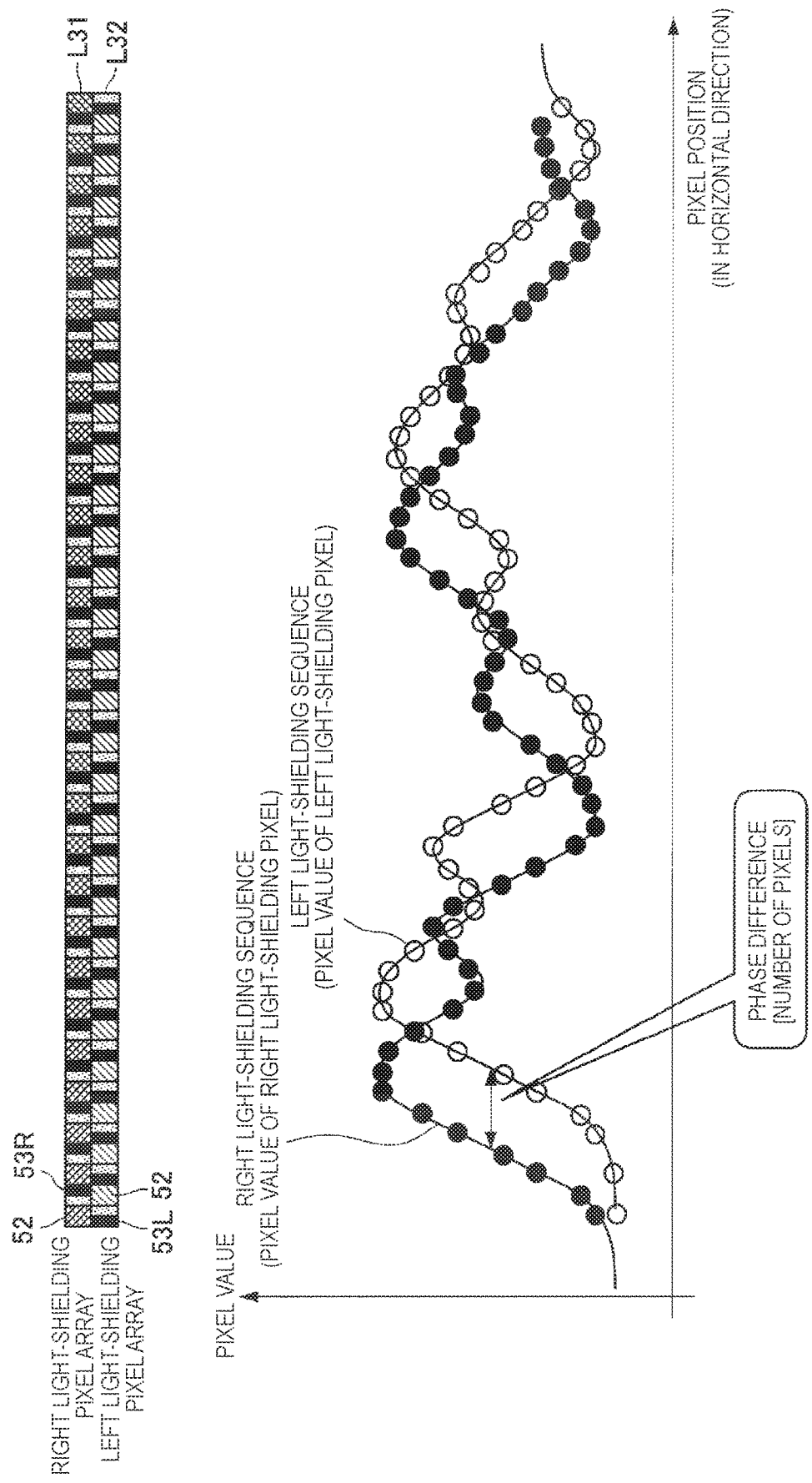
FIG. 6 is a diagram illustrating examples of a right light-shielding sequence obtained from a line in which right light-shielding pixels 53R exist and a left light-shielding sequence obtained from a line in which left light-shielding pixels 53L paired with the right light-shielding pixels 53R exist.

FIG. 6 is a diagram illustrating examples of the right light-shielding sequence obtained from the line in which the right light-shielding pixels 53R exist and the left light-shielding sequence obtained from the line in which the left light-shielding pixels 53L paired with the right light-shielding pixels 53R exist.

In FIG. 6, a horizontal axis shows a position of a pixel and a vertical axis shows a pixel value.

In FIG. 6, some G pixels in a line L31 in which R pixels that are the normal pixels 52 exist serve as the right light-shielding pixels 53R. Further, in FIG. 6, some G pixels in a line L32 immediately after the line L31 serve as the left light-shielding pixels 53L. In addition, for example, the right light-shielding pixels 53R and the left light-shielding pixels 53L that are in lower-left oblique portions from the right light-shielding pixels 53R are paired to detect a phase difference (between a left light-shielding image and a right light-shielding image).

By using the left light-shielding sequence and the right light-shielding sequence, the phase difference can be obtained (detected) in the unit of the number of pixels.

A defocus amount obtained when a subject image is in a focused state is 0, and therefore it is possible to perform AF by moving the lens position of the imaging optical system 11A so that a defocus amount detected on the basis of the phase difference is 0.

Figure 7:
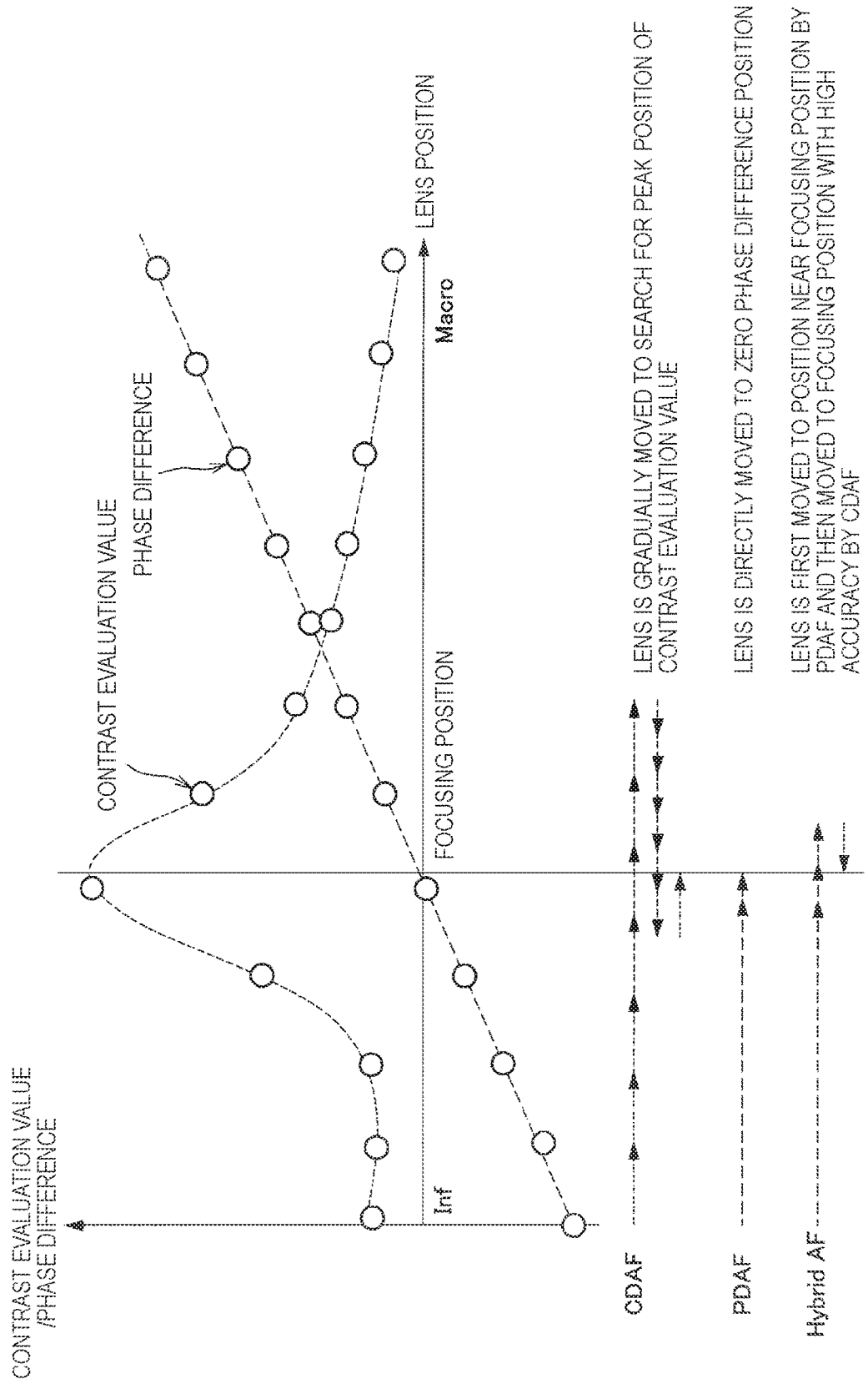
FIG. 7 is a diagram for describing contrast detection AF (CDAF), phase detection AF (PDAF), and hybrid AF.

Next, autofocus (AF) will be described. FIG. 7 is a diagram for describing the contrast detection AF (CDAF), the phase detection AF (PDAF), and hybrid AF.

In FIG. 7, a horizontal axis shows the lens position of the imaging optical system 11A and a vertical axis shows a contrast evaluation value and a phase difference.

Further, in FIG. 7, a left direction of the horizontal axis shows an infinity (Inf) direction and a right direction shows a macro direction.

Herein, the Inf direction is a direction in which a subject at a far position is in focus, and the macro direction is a direction in which a subject at a close position is in focus.

In the contrast detection AF (CDAF), the contrast evaluation value indicating a contrast of an image to be taken is obtained at each lens position while moving the lens position. The lens position is moved so that the contrast evaluation value is increased.

The contrast evaluation value becomes the largest at a focusing position, and therefore, in the contrast detection AF, the lens position is moved to be close to the focusing position and passes the focusing position once. Thereafter, the lens position is slightly moved to pass the focusing position again, and, by using contrast evaluation values obtained at that time, a lens position at which the largest contrast evaluation value is obtained, i.e., the focusing position is detected. Then, the lens position is moved to the focusing position that is a position at which the largest contrast evaluation value is obtained.

In the phase detection AF (PDAF), it is assumed that the phase difference is 0 when the lens position is the focusing position, the lens position is, so to speak, directly moved so that the phase difference becomes 0.

In the hybrid AF, the lens position is first moved to a position near the focusing position by the phase detection AF, and thereafter the lens position is moved to the focusing position with high accuracy by the contrast detection AF.

Figure 8:
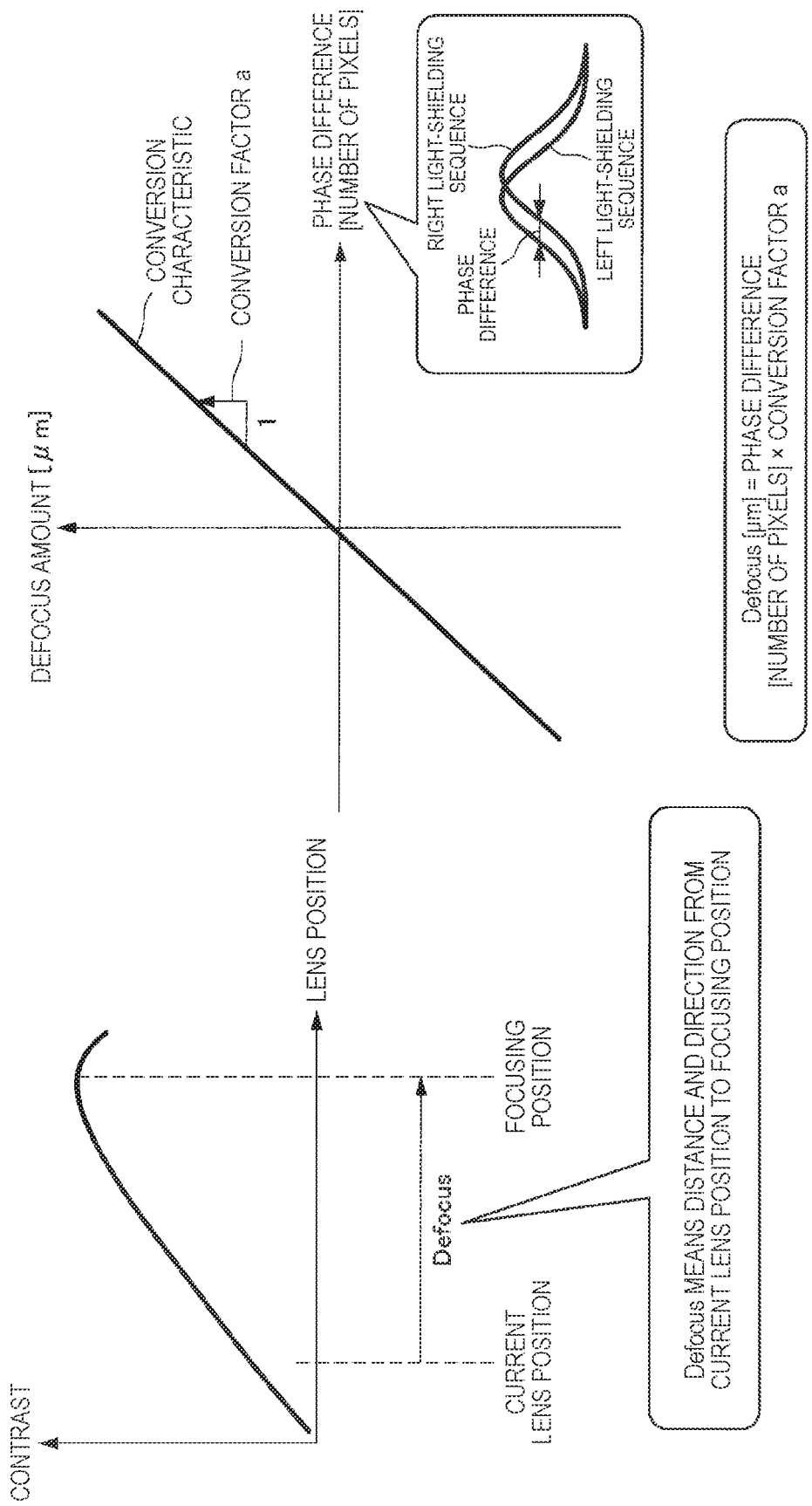
FIGS. 8A and 8B are diagrams for describing a relationship between phase difference and defocus amount.

Next, phase difference and a defocus amount will be described. FIGS. 8A and 8B are diagrams for describing a relationship between phase difference and defocus amount.

Both the phase difference and the defocus amount indicate a shift amount of a focus of a subject image. However, in AF, the defocus amount is used as a physical amount showing how far it is from a current lens position to the focusing position.

That is, in AF, the defocus amount shows a distance and direction from the current lens position to the focusing position.

FIG. 8A is a diagram for describing the defocus amount.

When a lens position at which the largest contrast evaluation value is obtained is used as the focusing position, the defocus amount shows a distance and direction from the current lens position to the focusing position.

Herein, when a moving amount of the lens position is shown by the um (micrometer), it is possible to employ um as a unit of the defocus amount.

Meanwhile, the phase difference shows a shift amount of a focus of a subject image as a relative positional relationship between left light-shielding image and right light-shielding image, and a unit thereof is the number of pixels.

FIG. 8B is a diagram illustrating a relationship between phase difference and defocus amount.

In FIG. 8B, a horizontal axis shows a phase difference and a vertical axis shows a defocus amount.

The phase difference and the defocus amount ideally have a linear relationship as illustrated in FIG. 8B, and therefore it is possible to obtain one of the phase difference and the defocus amount on the basis of the other one of the phase difference and the defocus amount.

Herein, when a coefficient for changing (converting) a phase difference into a defocus amount is used as a conversion factor a, it is possible to obtain a defocus amount by using a phase difference in accordance with Expression (1).

Defocus amount [um]=Phase difference [number of pixels]×Conversion factor a [um/number of pixels]     (1)

When the relationship between phase difference and defocus amount is used as a conversion characteristic, the conversion characteristic is ideally indicated by a straight line. As illustrated in FIG. 8B, in a two-dimensional plane in which a horizontal axis shows a phase difference and a vertical axis shows a defocus amount, the conversion factor a indicates slope of the conversion characteristic indicated by the straight line.

The conversion factor a can be acquired in advance (before shipment) by implementing a test and the like of the camera module in a factory that manufactures the camera module.

Next, there will be described focusing processing performed when, in a case where focusing is performed on a subject by using the phase detection AF (PDAF), both far and close subjects are included in a subject detection region for detecting a subject.

Figure 9:
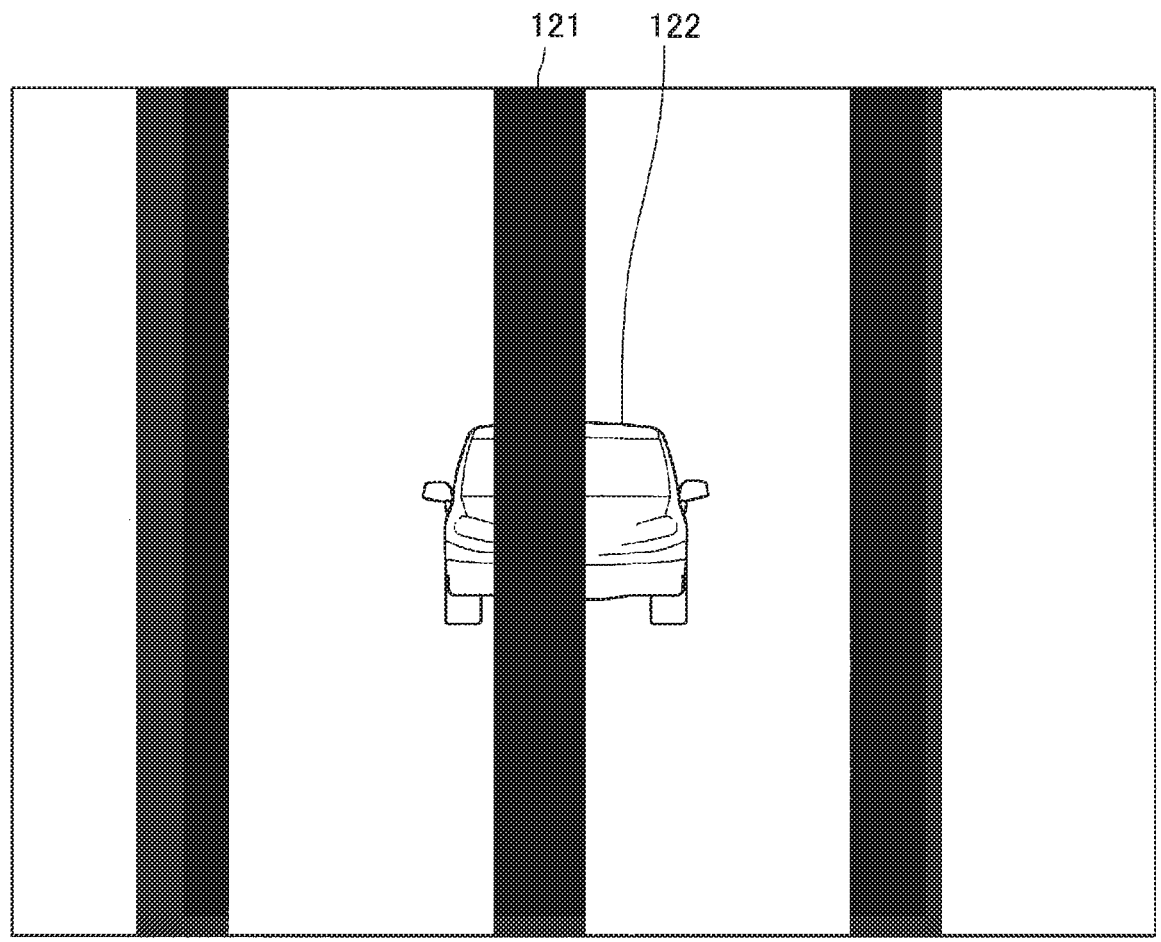
FIG. 9 is an explanatory view illustrating an example of both far and close subjects.

FIG. 9 is an explanatory view illustrating an example in which subjects exist at both far and close positions. FIG. 9 illustrates an example in which a fence 121 and an automobile 122 exist as subjects in a front side and in a back side, respectively.

In a case where subjects exist at both far and close positions as described above and focusing is attempted with respect to the subjects by using the phase detection AF (PDAF), neither of the subjects can be in focus in some cases.

Figure 10:
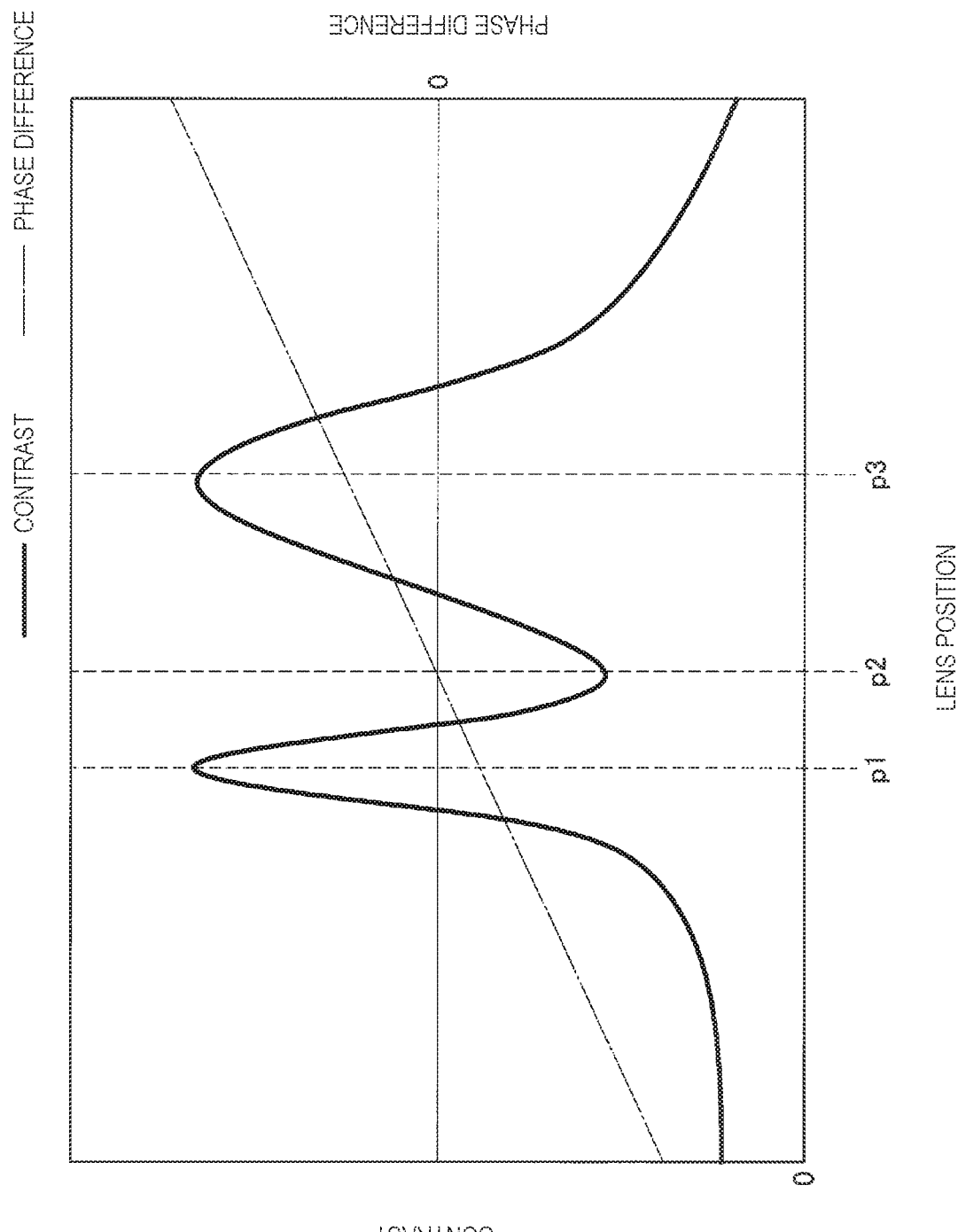
FIG. 10 is an explanatory view illustrating, by using a graph, an example in which contrasts and phase differences of both far and close subjects are obtained.

FIG. 10 is an explanatory view illustrating, by using a graph, an example in which contrasts and phase differences of both the far and close subjects illustrated in FIG. 9 are obtained. A horizontal axis in the graph of FIG. 10 shows the lens position of the imaging optical system 11A, and a vertical axes therein show a contrast (left side) and a phase difference (right side).

In the phase detection AF (PDAF), the lens position is controlled to be moved so that the phase difference becomes 0. Meanwhile, in the contrast detection AF (CDAF), the lens position is controlled to be moved to a peak of the contrast.

In the graph illustrated in FIG. 10, p2 indicates a lens position at which the phase difference is 0, p1 indicates a lens position at which a contrast of the subject on the far side reaches a peak, and p3 indicates a lens position at which a contrast of the subject on the close side reaches a peak.

However, as illustrated in FIG. 10, when a phase difference is obtained in a situation in which both far and close subjects exist, the lens position at which the phase difference is 0 is different from both the lens position at which the contrast of the subject on the far side reaches a peak and the lens position at which the contrast of the subject on the close side reaches a peak. Therefore, in a case where subjects exist at both far and close positions and focusing is attempted with respect to the subjects by using the phase detection AF (PDAF), neither of the subjects can be in focus in some cases.

In view of this, the disclosers of the present technology have diligently studied a technology of efficiently determining a lens position even in a case where both far and close subjects exist.

As a result, the disclosers of the present technology have devised a technology that divides a region for detecting a subject in a captured image (subject detection region) and obtains values of defocus amounts (defocus values) of the subject detection region and each divided region, thereby efficiently determining a lens position by using those defocus values even in a case where both far and close subjects exist.

Figure 11:
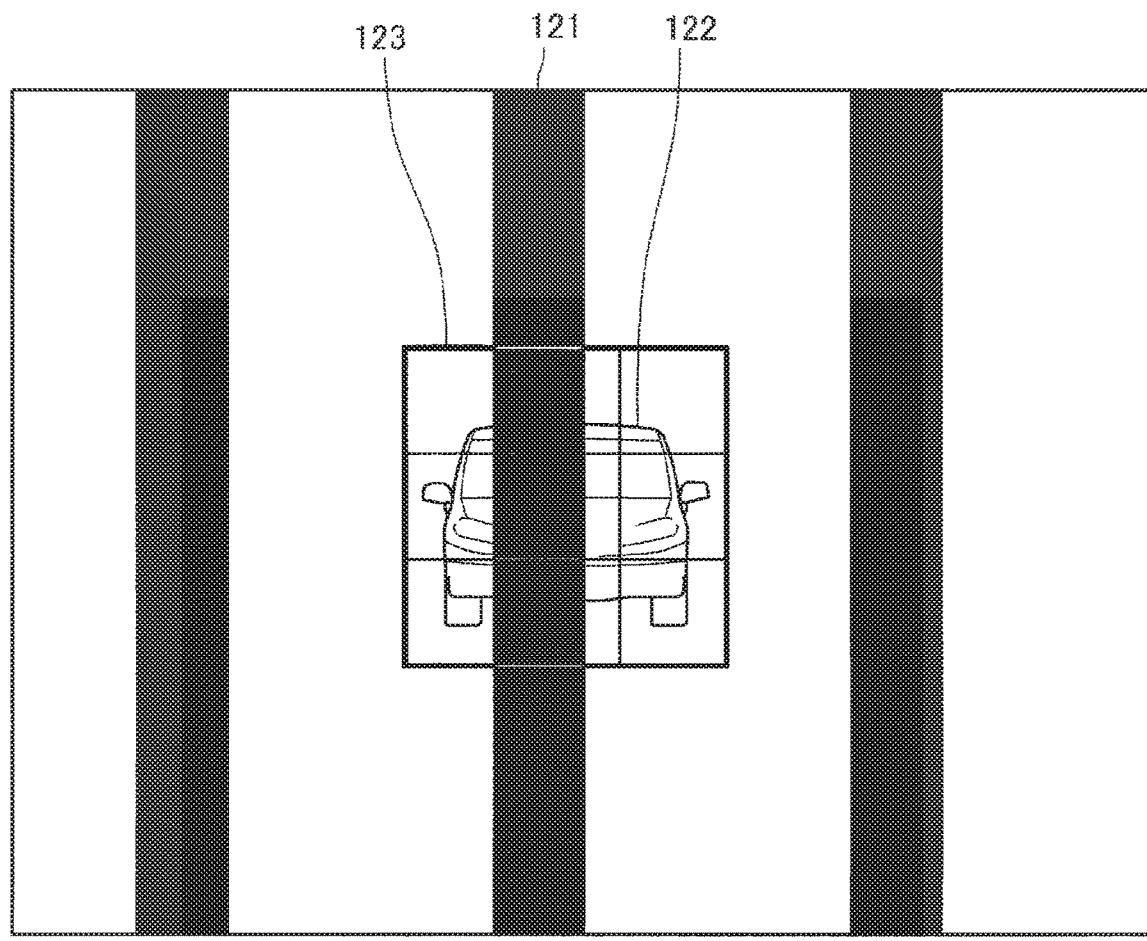
FIG. 11 is an explanatory view illustrating an example of a subject detection region.

FIG. 11 is an explanatory view illustrating an example of the subject detection region. FIG. 11 illustrates an example in which a subject detection region 130 is divided into nine regions in total, i.e., three regions in a vertical column and three regions in a horizontal row. Note that division of the subject detection region 130 is not limited to such an example.

Further, FIG. 11 illustrates a diagram in which all the divided regions are included in the subject detection region 130. However, the present disclosure is not limited to such an example. That is, a plurality of subject detection regions, each of which has at least a part overlapping with the subject detection region 130 and is smaller than the subject detection region 130, may be prepared and a defocus value of each region may be obtained.

In the present embodiment, defocus values of the subject detection region 130 and the nine divided regions are calculated in a state in which the lens position of the imaging optical system 11A is at a predetermined position, and the lens position of the imaging optical system 11A is determined by using those defocus values. Hereinafter, processing for determining the lens position of the imaging optical system 11A will also be simply referred to as "lens position determination processing".

Figure 12:
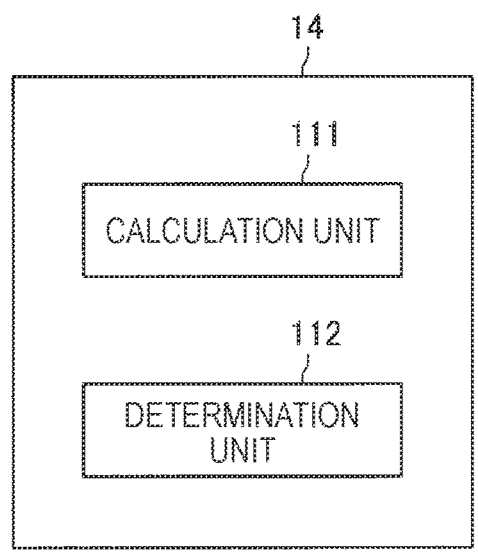
FIG. 12 is an explanatory view illustrating a functional configuration example of a main processing unit 14.

FIG. 12 is an explanatory view illustrating a functional configuration example of the main processing unit 14. As illustrated in FIG. 12, the main processing unit 14 includes a calculation unit 111 and a determination unit 112.

The calculation unit 111 calculates defocus values of the subject detection region 130 and the nine divided regions in a state in which the lens position of the imaging optical system 11A is at a predetermined position. When the defocus values are added to the lens position obtained when the defocus values are calculated, the lens position corresponds to a lens position at which a target subject is in focus. The defocus values calculated by the calculation unit 111 are used for the lens position determination processing performed by the determination unit 112.

When the calculation unit 111 calculates the defocus value of each region, the calculation unit 111 may convert the calculated defocus values into a histogram. The defocus values converted into a histogram by the calculation unit 111 are used for the lens position determination processing performed by the determination unit 112.

Further, the calculation unit 111 may smooth the defocus values converted into the histogram. The defocus values converted into the histogram and smoothed by the calculation unit 111 are used for the lens position determination processing performed by the determination unit 112.

The determination unit 112 performs the lens position determination processing in the subject detection region 130 by using the defocus values calculated by the calculation unit 111. Details of the lens position processing of the imaging optical system 11A performed by the determination unit 112 will be described below.

Hereinabove, a functional configuration example of the main processing unit 14 has been described. Next, operation of the camera module, in particular, the lens position determination processing performed by the main processing unit 14 will be described.

1.2. Operation Examples (Method 1)

A method 1 regarding the lens position determination processing is a method of arranging the calculated defocus values of the subject detection region 130 and the nine divided regions and determining that a subject exists on the macro side or infinity side if the number of regions between a macro-side or infinity-side defocus value and a predetermined threshold is a predetermined value or more, thereby determining the lens position of the imaging optical system 11A.

Figure 13:
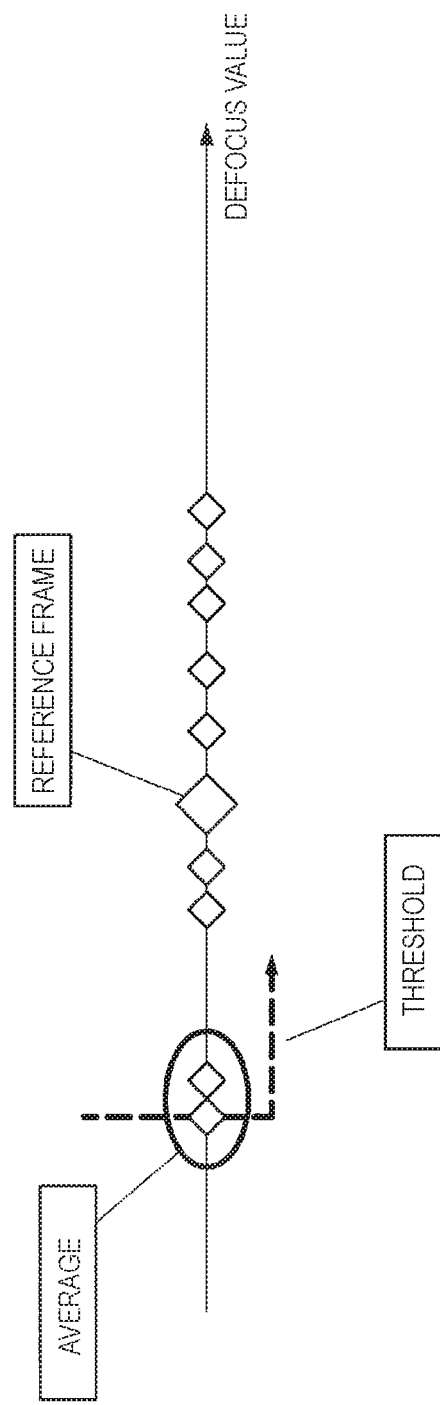
FIG. 13 is an explanatory view illustrating an outline of a method 1 regarding lens position determination processing.

FIG. 13 is an explanatory view illustrating an outline of the method 1 regarding the lens position determination processing. FIG. 13 illustrates an example in which the calculated defocus values of the subject detection region 130 and the nine divided regions are arranged. In the method 1, the processing is started from the macro-side or infinity-side defocus value, and the number of regions between the defocus value and the predetermined threshold is compared with the predetermined value.

Note that a reference frame indicates the whole subject detection region 130. In the following description, the whole subject detection region 130 will also be referred to as "reference frame", and each frame into which the reference frame is divided will also be referred to as "divided frame".

Then, if, as a result of the comparison, the number of regions is the predetermined value or more, it is determined that a subject exists on the macro side or infinity side, the defocus values of the regions are averaged, and the lens position of the imaging optical system 11A is determined by using the average value. Then, the imaging optical system 11A is moved to the determined position, and PDAF is executed.

Figure 14:
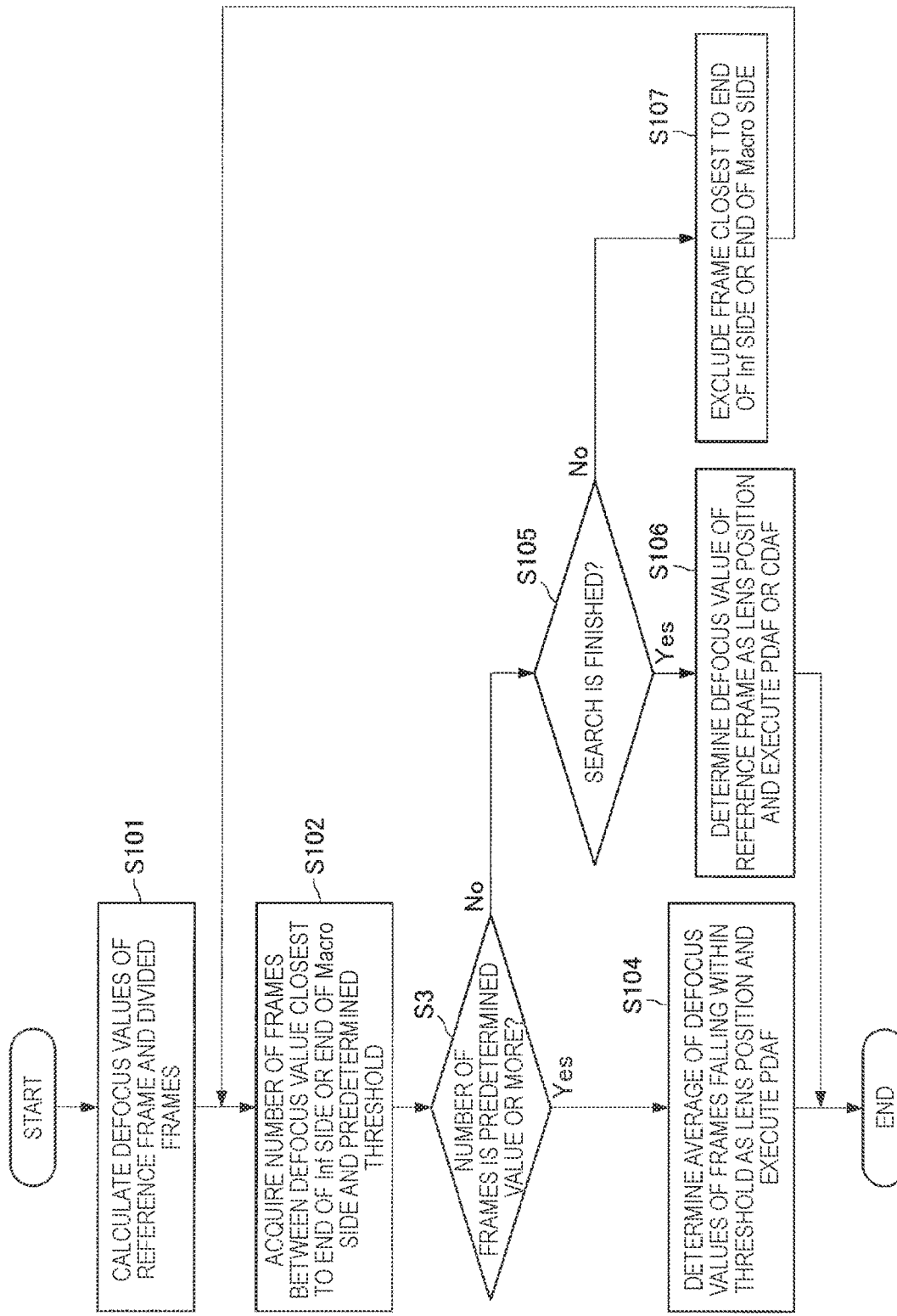
FIG. 14 is a flowchart showing lens position determination processing performed by the main processing unit 14.

FIG. 14 is a flowchart showing the lens position determination processing performed by the main processing unit 14 by using the method 1. Hereinafter, the lens position determination processing performed by the main processing unit 14 by using the method 1 will be described with reference to FIG. 14.

The main processing unit 14 first calculates defocus values of the reference frame and divided frames in a state in which the lens position of the imaging optical system 11A is at a predetermined position (Step S101). The calculation of defocus values in Step S101 is performed by the calculation unit 111.

The main processing unit 14 may be configured not to use, in the subsequent lens position determination processing, a frame whose phase difference reliability does not satisfy a predetermined reference when the defocus values of the reference frame and divided frames are calculated. The phase difference reliability is disclosed in JP 2010-139942A previously proposed by the applicant of the present application.

When the defocus values of the reference frame and divided frames are calculated in Step S101, then the main processing unit 14 acquires the number of frames between a defocus value closest to the end of the Inf side or the end of the Macro side and a predetermined threshold (Step S102). The acquisition processing in Step S102 is performed by, for example, the determination unit 112.

Note that the main processing unit 14 may exclude the reference frame when acquiring the number of frames. The main processing unit 14 may determine from which side to acquire the number of frames, the Inf side or the Macro side, on the basis of a previous setting or on the basis of designation made by a user.

When the number of frames is acquired in Step S102, then the main processing unit 14 determines whether or not the acquired number of frames is a predetermined value or more (Step S103). The determination processing in Step S103 is performed by, for example, the determination unit 112.

If, as a result of the determination in Step S103, the number of frames is the predetermined value or more (Step S103, Yes), the main processing unit 14 determines that a subject exists on the infinity side or macro side in the reference frame, determines the lens position of the imaging optical system 11A on the basis of an average of defocus values of the frames falling within the threshold, and causes the phase detection AF processing unit 17 to execute PDAF (Step S104). The determination of the lens position of the imaging optical system 11A is performed by the determination unit 112.

On the contrary, if, as a result of the determination in Step S103, the number of frames is less than the predetermined value (Step S103, No), the main processing unit 14 determines whether or not all the frames has been searched (Step S104). The determination processing in Step S104 is performed by, for example, the determination unit 112.

In a case where, as a result of the determination in Step S104, all the frames has been searched (Step S104, Yes), the main processing unit 14 determines the lens position of the imaging optical system 11A on the basis of the defocus amount of the reference frame and causes PDAF or CDAF to be executed (Step S105). The determination of the lens position of the imaging optical system 11A is performed by the determination unit 112.

On the contrary, in a case where, as a result of the determination in Step S104, not all the frames have been searched (Step S104, No), the main processing unit 14 excludes a frame closest to the Inf side or the end of the Macro side (Step S106). The exclusion processing in Step S106 is performed by, for example, the determination unit 112.

Then, when the frame closest to the the end of Inf side or the end of the Macro side is excluded in Step S106, the main processing unit 14 returns to the processing in Step S102 and acquires the number of frames between a defocus value (after exclusion) closest to the end of the Inf side or the end of the Macro side and the predetermined threshold.

By executing the above-described series of operation, even if subjects exist on both the infinity side (Inf side) and the macro side (Macro side) in the subject detection region 130, the main processing unit 14 can determine the lens position of the imaging optical system 11A so that one of the subjects can be in focus.

(Method 2)
A method 2 regarding the lens position determination processing is a method of arranging the calculated defocus values of the subject detection region 130 and the nine divided regions, determining whether or not the number of regions that is out of the ranges from the defocus value of the reference frame to predetermined thresholds in infinity-side (Inf-side) and macro-side (Macro-side) directions is a predetermined value or more, and determining that a subject exists on the macro side or infinity side in a case where the number of regions that is out of the range between the predetermined thresholds is the predetermined value or more, thereby determining that the lens position of the imaging optical system 11A is on the macro side or infinity side.

Figure 15:
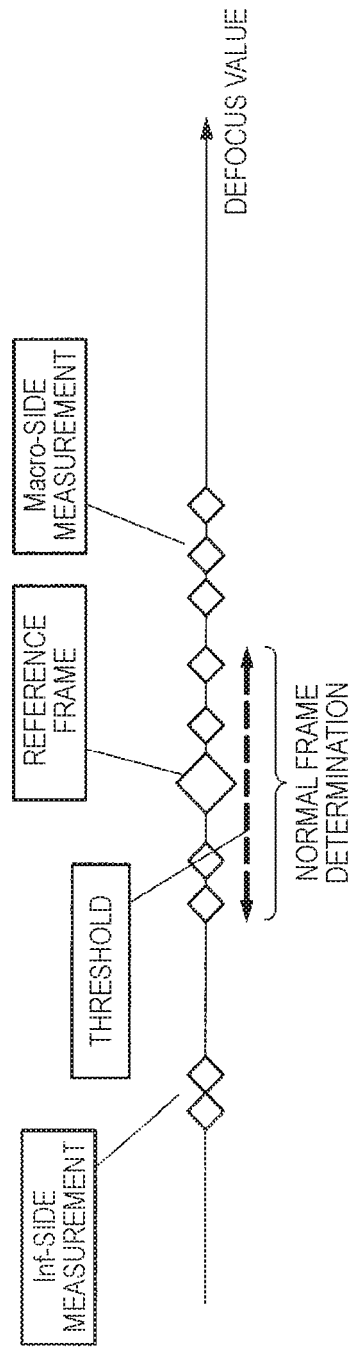
FIG. 15 is an explanatory view illustrating an outline of a method 2 regarding lens position determination processing.

FIG. 15 is an explanatory view illustrating an outline of the method 2 regarding the lens position determination processing. FIG. 15 illustrates an example in which the calculated defocus values of the subject detection region 130 and the nine divided regions are arranged.

In the method 2, it is determined whether or not the number of regions that is out of the ranges from the defocus value of the reference frame to the predetermined thresholds in the infinity-side (Inf-side) and macro-side (Macro-side) directions is the predetermined value or more.

If the number of regions that is out of the ranges between the predetermined thresholds is the predetermined value or more, it is determined that a subject exists on the macro side or infinity side, and the lens position of the imaging optical system 11A is to be on the macro side or infinity side.

Figure 16:
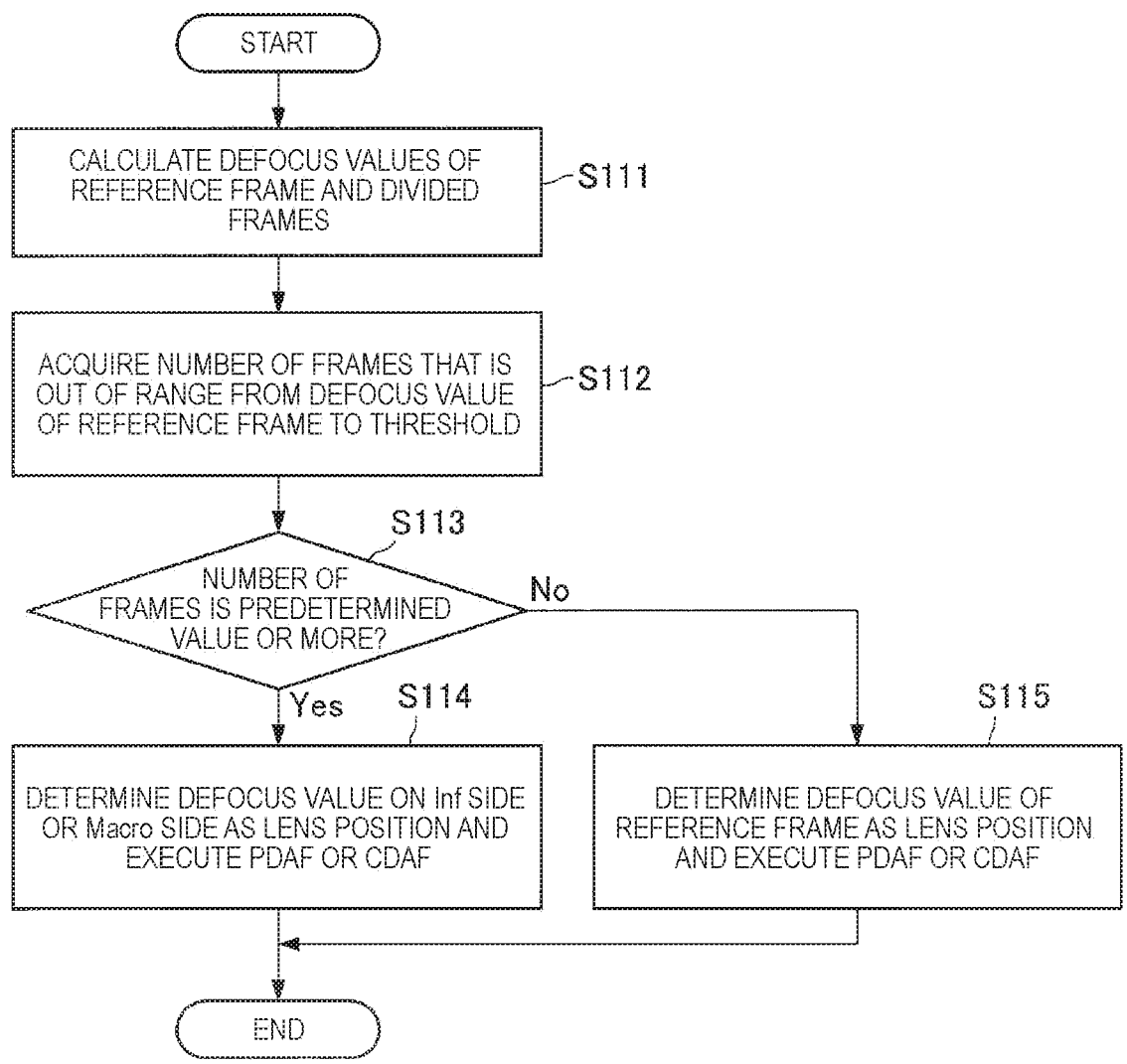
FIG. 16 is a flowchart showing lens position determination processing performed by the main processing unit 14.

FIG. 16 is a flowchart showing the lens position determination processing performed by the main processing unit 14 by using the method 2. Hereinafter, the lens position determination processing performed by the main processing unit 14 by using the method 2 will be described with reference to FIG. 16.

The main processing unit 14 first calculates defocus values of the reference frame and divided frames in a state in which the lens position of the imaging optical system 11A is at a predetermined position (Step S111). The calculation of defocus values in Step S111 is performed by the calculation unit 111.

In a way similar to the method 1, the main processing unit 14 may be configured not to use, in the subsequent lens position determination processing, a frame whose phase difference reliability does not satisfy a predetermined reference when the defocus values of the reference frame and the divided frames are calculated.

When the defocus values of the reference frame and the divided frames are calculated in Step S111, then the main processing unit 14 acquires the number of frames that are out of a ranges from the defocus value of the reference frame to predetermined thresholds (Step S112). The acquisition processing in Step S112 is performed by, for example, the determination unit 112.

When the number of frames that are out of the ranges from the defocus value of the reference frame to the predetermined thresholds is acquired in Step S112, then the main processing unit 14 determines whether or not the acquired number of frames is a predetermined value or more (Step S113). The determination processing in Step S113 is performed by, for example, the determination unit 112.

If, as a result of the determination in Step S113, the number of frames is the predetermined value or more (Step S113, Yes), the main processing unit 14 determines the lens position on the basis of defocus values on the Inf-side or Macro-side and causes PDAF or CDAF to be executed (Step S114). The determination of the lens position of the imaging optical system 11A is performed by the determination unit 112.

For example, if the number of frames that are out of the ranges from the defocus value of the reference frame to the predetermined thresholds are two on the Inf side and four on the Macro side and the predetermined value is five, the main processing unit 14 determines the lens position on the basis of defocus values on the Inf side or the Macro side and causes PDAF or CDAF to be executed.

The main processing unit 14 may determine which of PDAF or CDAF to be executed, on the basis of a previous setting or on the basis of designation made by a user.

Further, when causing PDAF or CDAF to be executed, the main processing unit 14 may determine which of the defocus values on the Inf side or the defocus values on the Macro side to use, on the basis of a previous setting or on the basis of designation made by a user.

Further, regarding determination on which of the defocus values on the Inf side or the defocus values on the Macro side to use when causing PDAF or CDAF to be executed, the main processing unit 14 may determine to use the defocus values on one of the sides including the larger number of frames between the predetermined threshold and a defocus value closest to the end of the Inf side or the end of the Macro side.

Further, when selecting a frame on the Inf side or the Macro side frame, the main processing unit 14 may select a frame farthest from the reference frame or may select a frame closest to the reference frame. Further, the main processing unit 14 may determine the lens position on the basis of an average of the defocus values of frames on the Inf side or frames on the Macro side.

On the contrary, if, as a result of the determination in Step S113, the number of frames is less than the predetermined value (Step S113, No), the main processing unit 14 determines the lens position on the basis of the defocus value of the reference frame and causes PDAF or CDAF to be executed (Step S115). The determination of the lens position of the imaging optical system 11A is performed by the determination unit 112.

By executing the above-described series of operation, even if subjects exist on both the infinity side (Inf side) and the macro side (Macro side) in the subject detection region 130, the main processing unit 14 can determine the lens position of the imaging optical system 11A so that one of the subjects can be in focus.

Further, the main processing unit 14 can change an adjustment width in the lens position determination processing by using the predetermined threshold used in the frame acquisition processing in Step S112 or the predetermined value used in the determination processing in Step S113.

(Method 3)

A method 3 regarding the lens position determination processing is a method of converting the calculated defocus values of the subject detection region 130 and the nine divided regions into a histogram and determining that a subject exists on the macro side or infinity side if the defocus values converted into the histogram satisfy a predetermined condition, thereby determining whether the lens position of the imaging optical system 11A is to be on the macro side or infinity side.

Figure 17:
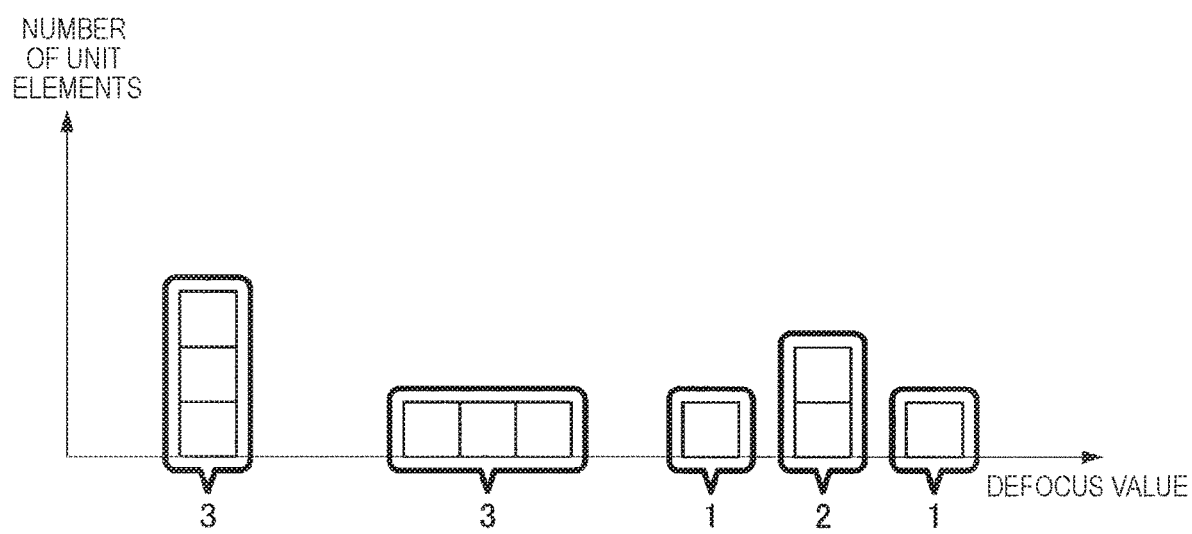
FIG. 17 is an explanatory view illustrating an outline of a method 3 regarding lens position determination processing.

FIG. 17 is an explanatory view illustrating an outline of the method 3 regarding the lens position determination processing. FIG. 17 illustrates an example in which the calculated defocus values of the subject detection region 130 and the nine divided regions are arranged in a histogram.

In this method 3 as the predetermined condition, a condition that, in a case where unit elements included in the histogram ("unit element" means a single square in the histogram of FIG. 17) are adjacent, the number of unit elements is counted and the number of groups (bins) in which the number of unit elements is a threshold or more is two or more is used. If this condition is satisfied, it is determined that a subject exists on the macro side or infinity side, and the lens position of the imaging optical system 11A is determined to be on the macro side or infinity side.

In the example of FIG. 17, the number of adjacent unit elements is 3, 3, 1, 2, and 1 from the left side. When the threshold is two, the number of groups (bins) equal to or more than the threshold is three. Therefore, because the number of groups (bins) equal to or more than the threshold is two or more, it is determined that a subject exists on the macro side or infinity side, and the lens position of the imaging optical system 11A is determined to be on the macro side or infinity side.

Figure 18:
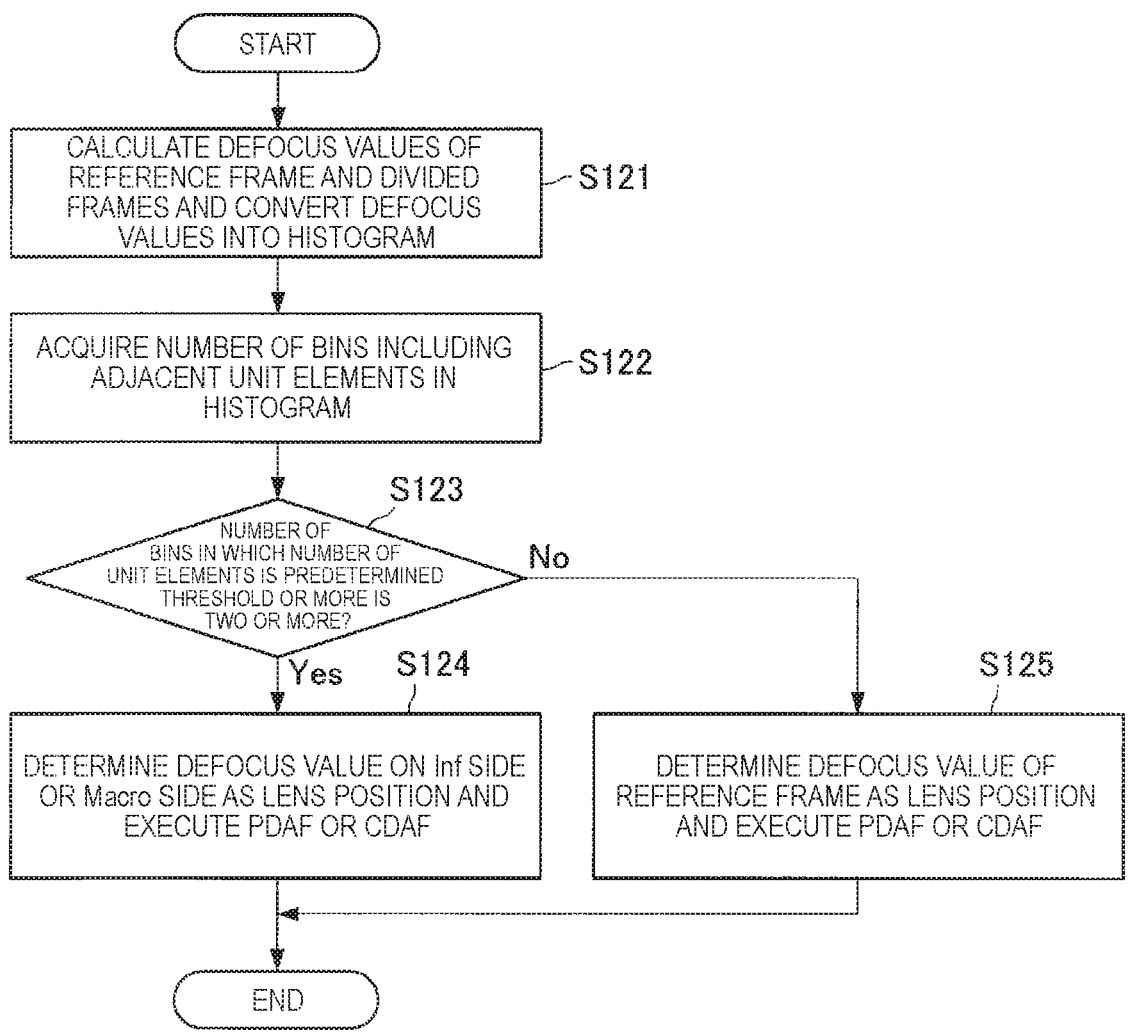
FIG. 18 is a flowchart showing lens position determination processing performed by the main processing unit 14.

FIG. 18 is a flowchart showing the lens position determination processing performed by the main processing unit 14 by using the method 3. Hereinafter, the lens position determination processing performed by the main processing unit 14 by using the method 3 will be described with reference to FIG. 18.

The main processing unit 14 first calculates defocus values of the reference frame and divided frames in a state in which the lens position of the imaging optical system 11A is at a predetermined position and converts the defocus values into a histogram (Step S121). The calculation of defocus values and the conversion thereof into a histogram in Step S121 are performed by the calculation unit 111.

In a way similar to the methods 1 and 2, the main processing unit 14 may be configured not to use, in the subsequent lens position determination processing, a frame whose phase difference reliability does not satisfy a predetermined reference when the defocus values of the reference frame and divided frames are calculated.

When the defocus values of the reference frame and divided frames are calculated and are converted into a histogram in Step S121, then the main processing unit 14 acquires the number of bins including adjacent unit elements in the histogram (Step S122). The acquisition processing in Step S122 is performed by, for example, the determination unit 112.

When the number of bins including adjacent unit elements in the histogram is acquired in Step S112, then the main processing unit 14 determines whether or not the number of bins in which the number of unit elements is a predetermined threshold or more is two or more (Step S123). The determination processing in Step S123 is performed by, for example, the determination unit 112. Note that the number of bins used as a reference of the determination is not limited to two or more, and the number of bins used as a reference may be "three or more", or the like.

If, as a result of the determination performed in Step S123, the number of bins in which the number of unit elements is the predetermined threshold or more is two or more (Step S123, Yes), the main processing unit 14 determines the lens position on the basis of defocus values on the Inf side or the Macro side and causes PDAF or CDAF to be executed (Step S124). The determination of the lens position of the imaging optical system 11A is performed by the determination unit 112.

The main processing unit 14 may determine which of PDAF or CDAF to be executed, on the basis of a previous setting or on the basis of designation made by a user.

Further, when causing PDAF or CDAF to be executed, the main processing unit 14 may determine which of the defocus values on the Inf side or the defocus values on the Macro side to use, on the basis of a previous setting or on the basis of designation made by a user.

Further, regarding determination on which of the defocus values on the Inf side or the defocus values on the Macro side to use when causing PDAF or CDAF to be executed, the main processing unit 14 may determine to use one of the sides including the larger number of frames between the predetermined threshold and a defocus value closest to the end of the Inf side or a defocus value closest to the end of the Macro side.

Further, when selecting a frame on the Inf side or the Macro side, the main processing unit 14 may select a frame farthest from the reference frame or may select a frame closest to the reference frame. Further, the main processing unit 14 may determine the lens position on the basis of an average of the defocus values of the frames on the Inf side or the Macro side.

On the contrary, if, as a result of the determination performed in Step S123, the number of bins in which the number of unit elements is the predetermined threshold or more is less than two (Step S123, No), the main processing unit 14 determines the lens position on the basis of the defocus value of the reference frame and causes PDAF or CDAF to be executed (Step S125). The determination of the lens position of the imaging optical system 11A is performed by the determination unit 112.

By executing the above-described series of operation, even if subjects exist on both the infinity side (Inf side) and the macro side (Macro side) in the subject detection region 130, the main processing unit 14 can determine the lens position of the imaging optical system 11A so that one of the subjects can be in focus.

Further, in this method 3, even if the defocus value of the reference frame does not satisfy the phase difference reliability, it is possible to execute the above-described series of processing because the calculated defocus values of the subject detection region 130 and the nine divided regions are converted into a histogram.

(Method 4)

A method 4 regarding the lens position determination processing is a method of converting the calculated defocus values of the subject detection region 130 and the nine divided regions into a histogram and determining that a subject exists on the macro side or infinity side in a case where the defocus values converted into the histogram satisfy a predetermined condition, thereby determining the lens position of the imaging optical system 11A on the macro side or infinity side.

In this method 4, as the predetermined condition, a condition that, in a case where unit elements included in a histogram are adjacent, the number of unit elements is counted and a percentage of the sum of unit elements in a group (bin) having the largest number of unit elements and unit elements in a group having the second largest number of unit elements is a predetermined value or more, relative to the number of all unit elements, is used. If this condition is satisfied, it is determined that a subject exists on the macro side or infinity side, and the lens position of the imaging optical system 11A is determined on the macro side or infinity side.

In the example of FIG. 17, the number of adjacent unit elements is 3, 3, 1, 2, and 1 from the left side. Therefore, the sum of unit elements in the group (bin) having the largest number of unit elements and unit elements in the group having the second largest number of unit elements is 6.

When the threshold is 50%, the percentage of the sum of unit elements relative to all the unit elements is 60%, i.e., exceeds the threshold, and therefore it is determined that a subject exists on the macro side or infinity side, and the lens position of the imaging optical system 11A is determined to be on the macro side or infinity side.

Figure 19:
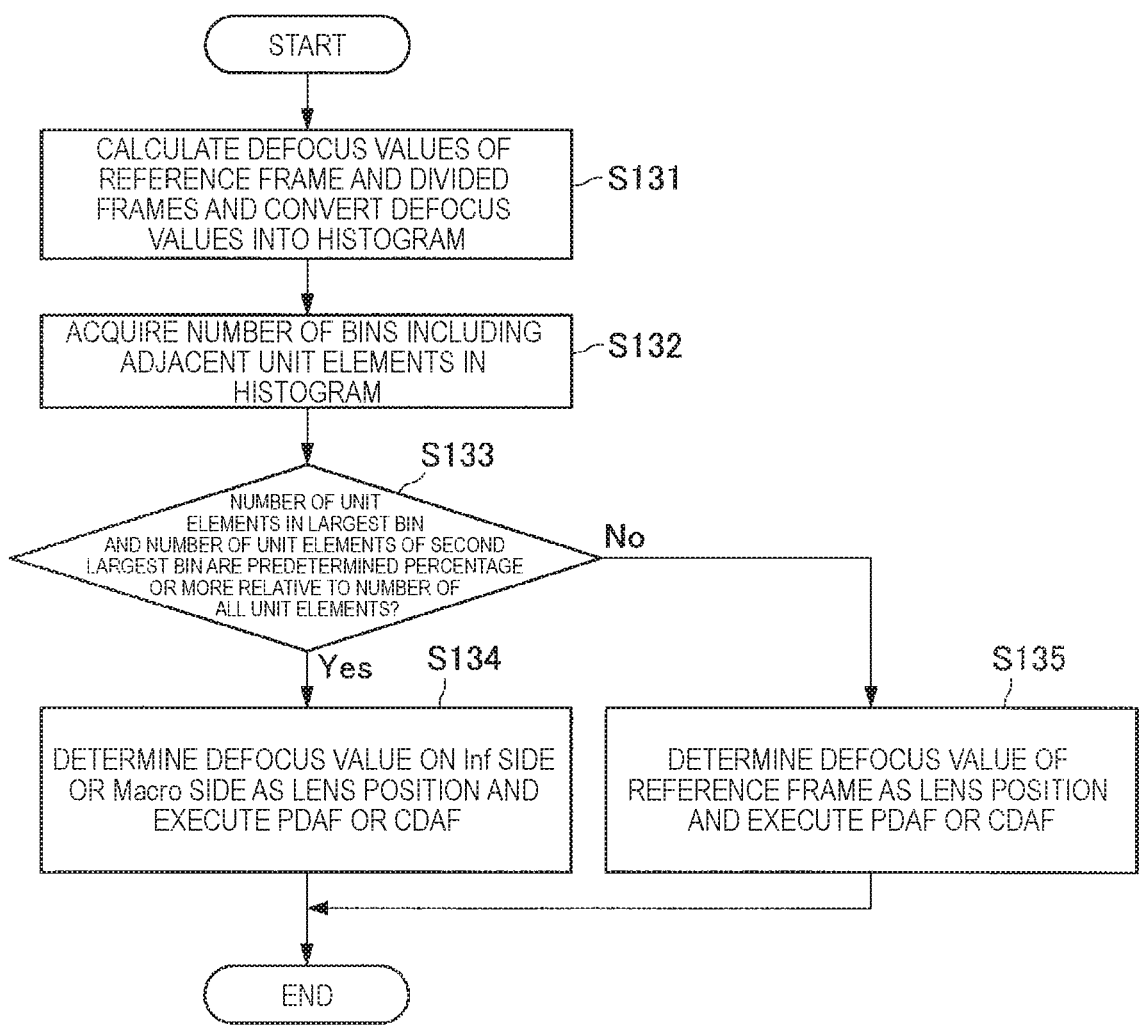
FIG. 19 is a flowchart showing lens position determination processing performed by the main processing unit 14.

FIG. 19 is a flowchart showing the lens position determination processing performed by the main processing unit 14 by using the method 4. Hereinafter, the lens position determination processing performed by the main processing unit 14 by using the method 4 will be described with reference to FIG. 19.

The main processing unit 14 first calculates defocus values of the reference frame and divided frames in a state in which the lens position of the imaging optical system 11A is at a predetermined position and converts the defocus values into a histogram (Step S131). The calculation of defocus values and the conversion thereof into a histogram in Step S131 are performed by the calculation unit 111.

In a way similar to the methods 1 to 3, the main processing unit 14 may be configured not to use, in the subsequent lens position determination processing, a frame whose phase difference reliability does not satisfy a predetermined reference when the defocus values of the reference frame and divided frames are calculated.

When the defocus values of the reference frame and divided frames are calculated and are converted into a histogram in Step S131, then the main processing unit 14 acquires the number of bins including adjacent unit elements in the histogram (Step S132). The acquisition processing in Step S132 is performed by, for example, the determination unit 112.

When the number of bins including adjacent unit elements in the histogram is acquired in Step S132, then the main processing unit 14 determines whether or not a percentage of the sum of unit elements in a bin having the largest number of unit elements and unit elements in a bin having the second largest number of unit elements relative to the number of all the unit elements is a predetermined value or more (Step S133). The determination processing in Step S133 is performed by, for example, the determination unit 112.

If, as a result of the determination in Step S133, the percentage of the sum of the number of unit elements in the bin having the largest number of unit elements and the number of unit elements in the bin having the second largest number of unit elements relative to the number of all the unit elements is the predetermined value or more (Step S133, Yes), the main processing unit 14 determines the lens position on the basis of defocus values on the Inf side or the Macro side and causes PDAF or CDAF to be executed (Step S134). The determination of the lens position of the imaging optical system 11A is performed by the determination unit 112.

The main processing unit 14 may determine which of PDAF or CDAF to be executed, on the basis of a previous setting or on the basis of designation made by a user.

Further, when causing PDAF or CDAF to be executed, the main processing unit 14 may determine which of the defocus values on the Inf side or the defocus values on the Macro side to use, on the basis of a previous setting or on the basis of designation made by a user.

Further, regarding determination on which of the defocus values on the Inf side or the defocus values on the Macro side to use when causing PDAF or CDAF to be executed, the main processing unit 14 may determine to use one of the sides having the larger number of frames between the predetermined threshold and a defocus value closest to the end of the Inf side or the end of the Macro side.

Further, when selecting a frame on the Inf side or the Macro side, the main processing unit 14 may select a frame farthest from the reference frame or may select a frame closest to the reference frame. Further, the main processing unit 14 may determine the lens position on the basis of an average of the defocus values of the frames on the Inf side or the Macro side.

On the contrary, if, as a result of the determination in Step S133, the percentage of the sum of the number of unit elements in the bin having the largest number of unit elements and the number of unit elements in the bin having the second largest number of unit elements relative to the number of all the unit elements is less than the predetermined value (Step S133, No), the main processing unit 14 determines the lens position on the basis of the defocus value of the reference frame and causes PDAF or CDAF to be executed (Step S135). The determination of the lens position of the imaging optical system 11A is performed by the determination unit 112.

By executing the above-described series of operation, even if subjects exist on both the infinity side (Inf side) and the macro side (Macro side) in the subject detection region 130, the main processing unit 14 can determine the lens position of the imaging optical system 11A so that one of the subjects can be in focus.

Further, in this method 4, in a way similar to the method 3, even if the defocus value of the reference frame does not satisfy the phase difference reliability, it is possible to execute the above-described series of processing because the calculated defocus values of the subject detection region 130 and the nine divided regions are converted into a histogram.

(Method 5)

A method 5 regarding the lens position determination processing is a method of converting the calculated defocus values of the subject detection region 130 and the nine divided regions into a histogram and determining that a subject exists on the macro side or infinity side if the defocus values converted into the histogram satisfy a predetermined condition, thereby determining the lens position of the imaging optical system 11A to be on the macro side or infinity side.

Figure 20:
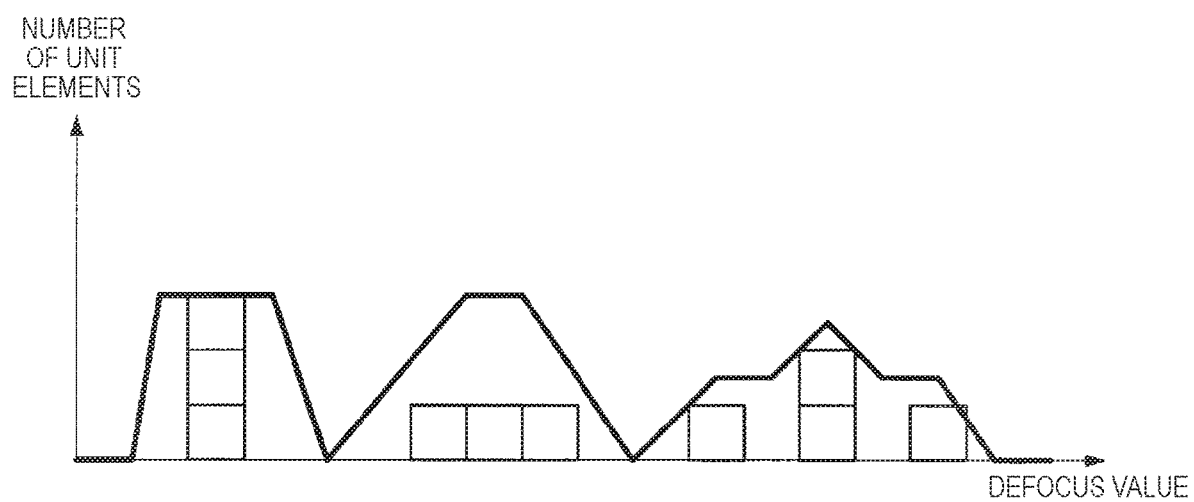
FIG. 20 is an explanatory view illustrating an outline of a method 5 regarding lens position determination processing.

FIG. 20 is an explanatory view illustrating an outline of the method 5 regarding the lens position determination processing. FIG. 20 illustrates an example in which the calculated defocus values of the subject detection region 130 and the nine divided regions are arranged in a histogram and the histogram is smoothed.

In this method 5, as the predetermined condition, a condition that the histogram of the defocus values is smoothed and a plurality of peaks exceeding a predetermined threshold exist in the smoothed histogram is used. If this condition is satisfied, it is determined that a subject exists on the macro side or infinity side, and the lens position of the imaging optical system 11A is determined to be on the macro side or infinity side.

Figure 21:
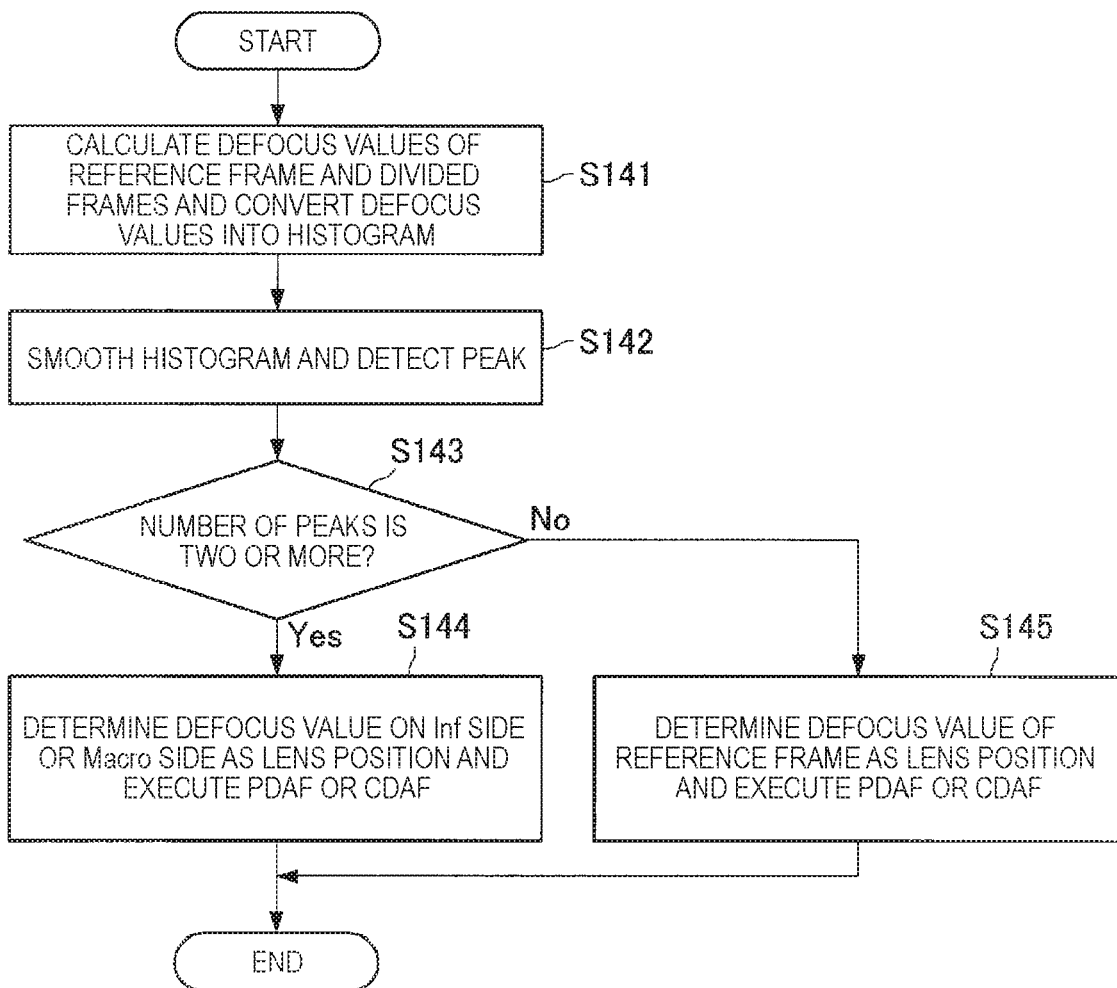
FIG. 21 is a flowchart showing lens position determination processing performed by the main processing unit 14.

FIG. 21 is a flowchart showing the lens position determination processing performed by the main processing unit 14 by using the method 5. Hereinafter, the lens position determination processing performed by the main processing unit 14 by using the method 5 will be described with reference to FIG. 21.

The main processing unit 14 first calculates defocus values of the reference frame and the divided frames in a state in which the lens position of the imaging optical system 11A is at a predetermined position and converts the defocus values into a histogram (Step S141). The calculation of defocus values and the conversion thereof into a histogram in Step S141 are performed by the calculation unit 111.

In a way similar to the methods 1 to 4, the main processing unit 14 may be configured not to use, in the subsequent lens position determination processing, a frame whose phase difference reliability does not satisfy a predetermined reference when the defocus values of the reference frame and the divided frames are calculated.

When the defocus values of the reference frame and the divided frames are calculated and are converted into a histogram in Step S141, then the main processing unit 14 smoothes the generated histogram and detects a peak exceeding a predetermined threshold (Step S142). The smoothing processing and the peak detection processing in Step S142 are performed by the calculation unit 111.

When the histogram is smoothed in Step S142, then the main processing unit 14 determines whether or not a plurality of peaks exceeding the predetermined threshold exist in the smoothed histogram (Step S143). The determination processing in Step S143 is performed by, for example, the determination unit 112.

If, as a result of the determination in Step S143, a plurality of peak exceeding the predetermined threshold exist in the smoothed histogram (Step S143, Yes), the main processing unit 14 determines the lens position on the basis of defocus values on the Inf side or the Macro side and causes PDAF or CDAF to be executed (Step S144). The determination of the lens position of the imaging optical system 11A is performed by the determination unit 112.

The main processing unit 14 may determine which of PDAF or CDAF to execute, on the basis of a previous setting or on the basis of designation made by a user.

Further, when executing PDAF or CDAF is executed, the main processing unit 14 may determine which of the defocus values on the Inf side or on the Macro side to use, on the basis of a previous setting or on the basis of designation made by a user.

Further, regarding determination on which of the defocus values on the Inf side or on the Macro side to use when causing PDAF or CDAF to be executed, the main processing unit 14 may determine to use one of the sides having the larger number of frames between the predetermined threshold and a defocus value closest to the end of the Inf side or the end of the Macro side.

Further, when selecting a frame on the Inf side or the Macro side, the main processing unit 14 may select a frame farthest from the reference frame or may select a frame closest to the reference frame. Further, the main processing unit 14 may determine the lens position on the basis of an average of the defocus values of frames on the Inf side or the Macro side.

On the contrary, if, as a result of the determination in Step S143, a plurality of peak exceeding the predetermined threshold do not exist in the smoothed histogram (Step S143, No), the main processing unit 14 determines the lens position on the basis of the defocus value of the reference frame and causes PDAF or CDAF to be executed (Step S145). The determination of the lens position of the imaging optical system 11A is performed by the determination unit 112.

By executing the above-described series of operation, even if subjects exist on both the infinity side (Inf side) and the macro side (Macro side) in the subject detection region 130, the main processing unit 14 can determine the lens position of the imaging optical system 11A so that one of the subjects can be in focus.

Further, in this method 5, in a way similar to the methods 3 and 4, even if the defocus value of the reference frame does not satisfy the phase difference reliability, it is possible to execute the above-described series of processing because the calculated defocus values of the subject detection region 130 and the nine divided regions are converted into a histogram.

Further, in this method 5, because the histogram is smoothed, it is possible to determine the lens position to be on the infinity side or macro side even in a case where unit elements of the histogram are not adjacent.

(Method 6)

A method 5 regarding the lens position determination processing is a method of converting the calculated defocus values of the subject detection region 130 and the nine divided regions into a histogram and determining that a subject exists on the macro side or infinity side if the defocus values converted into the histogram satisfy a predetermined condition, thereby determining the lens position of the imaging optical system 11A to be on the macro side or infinity side.

Figure 22:
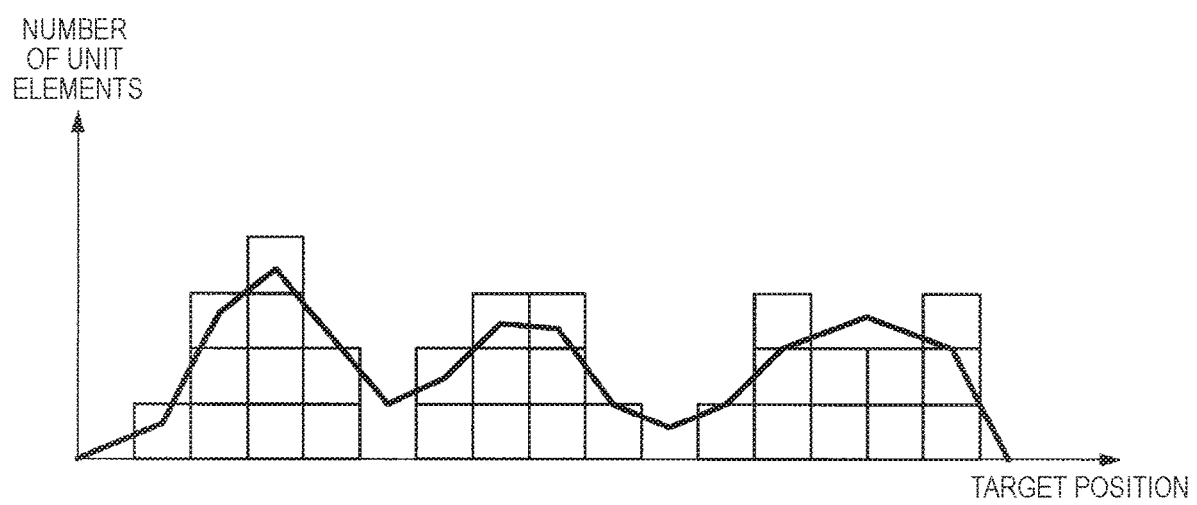
FIG. 22 is an explanatory view illustrating an outline of a method 6 regarding lens position determination processing.

FIG. 22 is an explanatory view illustrating an outline of the method 6 regarding the lens position determination processing. FIG. 22 illustrates an example in which the calculated defocus values of the subject detection region 130 and the nine divided regions are added in a time direction, are then arranged in a histogram, and the histogram is smoothed. In FIG. 22, a horizontal axis shows a target position of the lens of the the imaging optical system 11A obtained on the basis of the defocus values added in the time direction.

In this method 6, as the predetermined condition, a condition that the defocus values are added in the time direction, are then converted into a histogram and smoothed, and a plurality of peaks exceeding a predetermined threshold exist in the smoothed histogram is used. If this condition is satisfied, it is determined that a subject exists on the macro side or infinity side, and the lens position of the imaging optical system 11A is determined to be on the macro side or infinity side.

Figure 23:
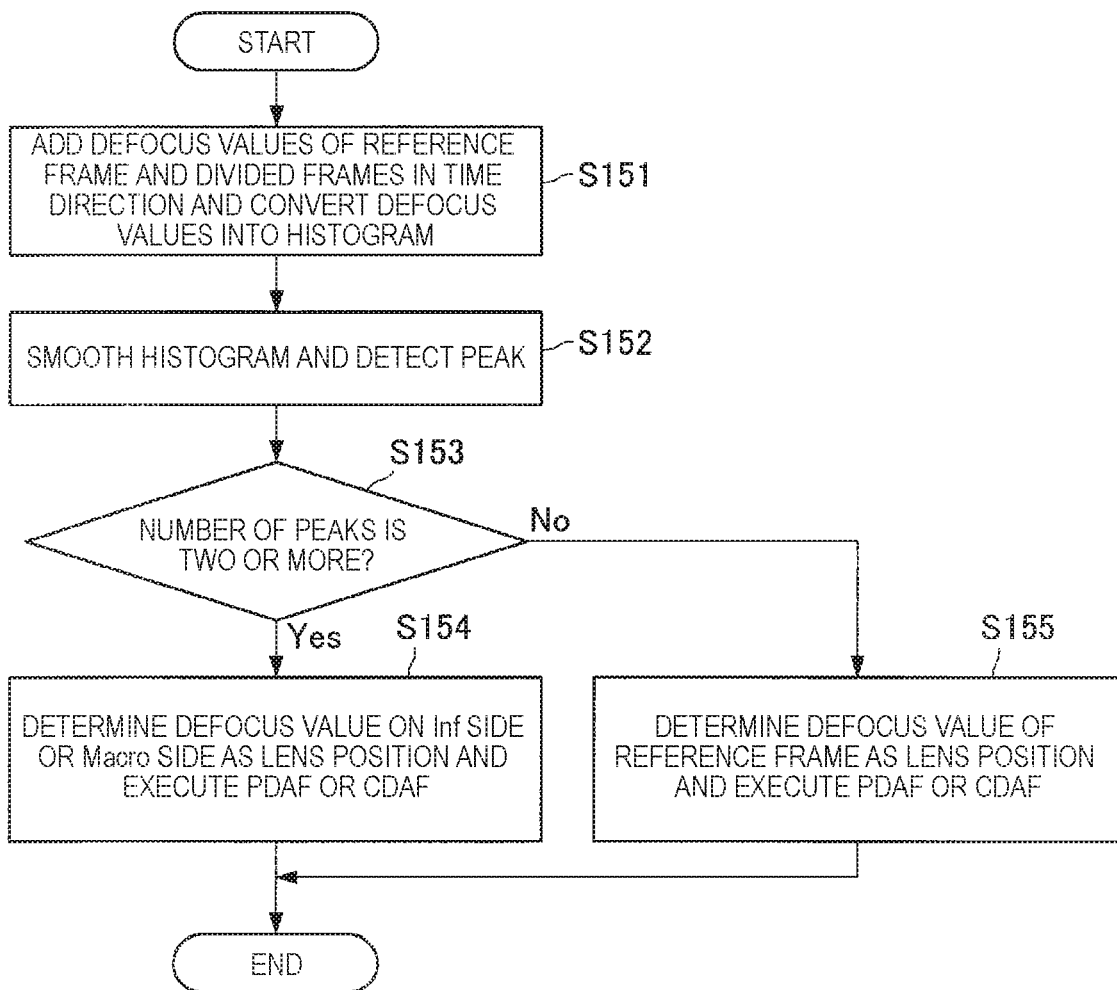
FIG. 23 is a flowchart showing lens position determination processing performed by the main processing unit 14.

FIG. 23 is a flowchart showing the lens position determination processing performed by the main processing unit 14 by using the method 6. Hereinafter, the lens position determination processing performed by the main processing unit 14 by using the method 6 will be described with reference to FIG. 23.

The main processing unit 14 first calculates defocus values of the reference frame and the divided frames in a state in which the lens position of the imaging optical system 11A is at a predetermined position, adds the defocus values in the time direction, and then converts the defocus values into a histogram (Step S151). The calculation of defocus values, the addition of the defocus values in the time direction, and the conversion of the defocus values into a histogram in Step S151 are performed by the calculation unit 111.

In a way similar to the methods 1 to 5, the main processing unit 14 may be configured not to use, in the subsequent lens position determination processing, a frame whose phase difference reliability does not satisfy a predetermined reference when the defocus values of the reference frame and the divided frames are calculated.

When the defocus values of the reference frame and the divided frames are calculated, and the defocus values are added in the time direction and converted into a histogram in Step S151, then the main processing unit 14 smoothes the generated histogram and detects a peak exceeding a predetermined threshold (Step S152). The smoothing processing and the peak detection processing in Step S152 are performed by the calculation unit 111.

When the histogram is smoothed in Step S142, then the main processing unit 14 determines whether or not a plurality of peaks exceeding the predetermined threshold exist in the smoothed histogram (Step S143). The determination processing in Step S143 is performed by, for example, the determination unit 112.

If, as a result of the determination in Step S153, a plurality of peak exceeding the predetermined threshold exist in the smoothed histogram (Step S153, Yes), the main processing unit 14 determines the lens position on the basis of defocus values on the Inf side or the Macro side and causes PDAF or CDAF to be executed (Step S154). The determination of the lens position of the imaging optical system 11A is performed by the determination unit 112.

The main processing unit 14 may determine which of PDAF or CDAF to be executed, on the basis of a previous setting or on the basis of designation made by a user.

Further, when causing PDAF or CDAF to be executed, the main processing unit 14 may determine which of the defocus values on the Inf side or the Macro side to use, on the basis of a previous setting or on the basis of designation made by a user.

Further, regarding determination on which of defocus values on the Inf side or the Macro side to use when causing PDAF or CDAF to be executed, the main processing unit 14 may determine to use one of the sides having the larger number of frames between the predetermined threshold and a defocus value closest to the end of the Inf side or the end of the Macro side.

Further, when selecting a frame on the Inf side or the Macro side, the main processing unit 14 may select a frame farthest from the reference frame or may select a frame closest to the reference frame. Further, the main processing unit 14 may determine the lens position on the basis of an average of the defocus values of frames on the Inf side or the Macro side.

On the contrary, if, as a result of the determination in Step S153, a plurality of peak exceeding the predetermined threshold do not exist in the smoothed histogram (Step S153, No), the main processing unit 14 determines the lens position on the basis of the defocus value of the reference frame and causes PDAF or CDAF to be executed (Step S155). The determination of the lens position of the imaging optical system 11A is performed by the determination unit 112.

By executing the above-described series of operation, even if subjects exist on both the infinity side (Inf side) and the macro side (Macro side) in the subject detection region 130, the main processing unit 14 can determine the lens position of the imaging optical system 11A so that one of the subjects can be in focus.

Further, in this method 6, in a way similar to the methods 3 to 5, even if the defocus value of the reference frame does not satisfy the phase difference reliability, it is possible to execute the above-described series of processing because the calculated defocus values of the subject detection region 130 and the nine divided regions are converted into a histogram.

Further, in this method 6, in a way similar to the method 5, because the histogram is smoothed, it is possible to determine the lens position to be on the infinity side or macro side even in a case where unit elements of the histogram are not adjacent.

Further, in this method 6, the total number of unit elements in a histogram is larger than the methods 3 to 5, and therefore it is possible to improve determination accuracy of the lens position.

Note that the focus position in the present disclosure may correspond to an image shift amount including a phase difference or defocus value. The defocus value is a value indicating a distance and direction from a current lens position to a focusing position, and therefore obtaining a defocus value corresponds to an example of calculating a focus position in the present disclosure. By analyzing a focus position in each region, the main processing unit 14 can calculate, on the basis of the focus positions, a moving amount of the lens of the imaging optical system 11A for causing a subject to be in focus.

Application Example

The above-described camera module can be used for, for example, various electronic devices that sense light such as visible light, infrared light, ultraviolet light, or X-rays as described below.

Electronic devices that take images used for viewing, such as a digital camera and a portable appliance with a camera function.

Electronic devices used for traffic, such as an in-vehicle sensor that takes images of the front and the back of a car, surroundings, the inside of the car, and the like, a monitoring camera that monitors travelling vehicles and roads, and a distance sensor that measures distances between vehicles and the like, which are used for safe driving (e.g., automatic stop), recognition of the condition of a driver, and the like.

Electronic devices used for home electrical appliances, such as a TV, a refrigerator, and an air conditioner, to takes images of a gesture of a user and operate appliances in accordance with the gesture.

Electronic devices used for medical care and health care, such as an endoscope and a device that performs angiography by reception of infrared light.

Electronic devices used for security, such as a monitoring camera for crime prevention and a camera for personal authentication.

Electronic devices used for beauty care, such as skin measurement equipment that takes images of the skin and a microscope that takes images of the scalp.

Electronic devices used for sports, such as an action camera and a wearable camera for sports and the like.

Electronic devices used for agriculture, such as a camera for monitoring the condition of the field and crops.

2. CONCLUSION

As described above, according to an embodiment of the present disclosure, it is possible to provide a camera module capable of determining the lens position of the imaging optical system 11A so that, even when subjects exist on both the infinity side (Inf side) and the macro side (Macro side) in the subject detection region 130, one of the subjects can be in focus.

For example, the main processing unit 14 arranges calculated defocus values of the subject detection region 130 and the nine divided regions, and determines that a subject exists on the macro side or infinity side if the number of regions between a defocus value on a macro side or an infinity side to a predetermined threshold is a predetermined value or more, thereby determining the lens position of the imaging optical system 11A.

Further, for example, the main processing unit 14 arranges calculated defocus values of the subject detection region 130 and the nine divided regions, determines whether or not the number of regions that is out of ranges from a defocus value of the reference frame to predetermined thresholds in the infinity-side (Inf-side) and macro-side (Macro-side) directions is a predetermined value or more, and determines that a subject exists on the macro side or infinity side if the number of regions that is out of the ranges between the predetermined thresholds is the predetermined value or more, thereby determining the lens position of the imaging optical system 11A to be on the macro side or infinity side.

Further, for example, in the method 3 regarding the lens position determination processing, the main processing unit 14 converts calculated defocus values of the subject detection region 130 and the nine divided regions into a histogram and determines that a subject exists on the macro side or infinity side if the defocus values converted into the histogram satisfy a predetermined condition, thereby determining the lens position of the imaging optical system 11A to be on the macro side or infinity side.

The predetermined condition may be, for example, a condition that, in a case where unit elements included in a histogram are adjacent, the number of the adjacent unit elements is counted and the number of groups in which the number of unit elements is a threshold or more is two or more, or may be a condition that, in a case where unit elements included in a histogram are adjacent, the number of the adjacent unit elements is counted and a percentage of the sum of unit elements in a group having the largest number of unit elements and unit elements in a group having the second largest number of unit elements relative to the number of all unit elements is a predetermined value or more.

Further, the predetermined condition may be a condition that a histogram of defocus values is smoothed and a plurality of peaks exceeding a predetermined threshold exist in the smoothed histogram, or may be a condition that defocus values are added in the time direction, then converted into a histogram, and smoothed, and a plurality of peaks exceeding a predetermined threshold exist in the smoothed histogram.

Processing steps in processes of the present specification may not necessarily be executed in a time series manner in the order described in the flowcharts or sequence diagrams. The processing steps in the processes may also be executed in, for example, a different order from the order described in the flowcharts or sequence diagrams, or may be executed in parallel.

Furthermore, a computer program for causing a processor (e.g., a CPU, a DSP, etc.) provided in a device of the present specification to function as the device (i.e., a computer program for causing the processor to execute operations of structural elements of the above-described device) can also be created. In addition, a recording medium in which the computer program is recorded may be provided. Moreover, a device that includes a memory storing the computer program and one or more processors that can execute the computer program (e.g., a finished product or a module for a finished product (a component, a processing circuit, a chip, or the like) may also be provided. In addition, a method including operations of one or more structural elements of the device is also included in the technology of the present disclosure.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A control device including:

a calculation unit configured to calculate, on a basis of a result of capturing a subject image passed through a focus lens by using an imaging element including a plurality of phase difference detection regions, a focus position of each of the phase difference detection regions; and a determination unit configured to determine a position of the focus lens on a basis of an average value of the focus positions of the phase difference detection regions calculated by the calculation unit and falling within a predetermined range from the focus position on an infinity side or macro side.

(2)

The control device according to (1), in which, if a number of the phase difference detection regions having the focus positions falling within the predetermined range is a predetermined threshold or more, the determination unit determines the position of the focus lens on a basis of the average value of the focus positions of the phase difference detection regions calculated by the calculation unit.

(3)

The control device according to (1) or (2), in which the phase difference detection region includes a first region and a plurality of second regions having at least a part overlapping with the first region.

(4)

A control device including:

a calculation unit configured to calculate, on a basis of a result of capturing a subject image passed through a focus lens by using an imaging element including a plurality of phase difference detection regions, a focus position of each of the phase difference detection regions; and a determination unit configured to determine a position of the focus lens on a basis of the focus position on an infinity side or macro side if a number of the phase difference detection regions whose focus positions are apart from the focus position of the phase difference detection region serving as a reference by a predetermined range or more, is a predetermined value or more.

(5)

A control device including:

a calculation unit configured to calculate, on a basis of a result of capturing a subject image passed through a focus lens by using an imaging element including a plurality of phase difference detection regions, a focus position of each of the phase difference detection regions and convert the focus positions into a histogram; and a determination unit configured to determine a position of the focus lens on a basis of the focus position on an infinity side or macro side in a case where each of the focus positions of the phase difference detection regions converted into the histogram satisfies a first predetermined condition.

(6)

The control device according to (5), in which the first predetermined condition is a condition that a plurality of groups in which a number of adjacent unit elements in the histogram is a predetermined value or more exists.

(7)

The control device according to (5), in which the first predetermined condition is a condition that a plurality of groups in which a number of adjacent unit elements in the histogram is a predetermined value or more exists and a number of unit elements in the groups satisfies a second predetermined condition.

(8)

The control device according to (7), in which the second predetermined condition is a condition that a percentage of a sum of a number of unit elements in a group having a largest number of unit elements and a number of unit elements in a group having a second largest number of unit elements relative to a number of all unit elements is a predetermined value or more.

(9)

The control device according to (5), in which the calculation unit smoothes the focus positions of the respective phase difference detection regions converted into the histogram, and the first predetermined condition is a condition that a plurality of peaks exceeding a predetermined threshold exist in the smoothed histogram.

(10)

The control device according to (5), in which the calculation unit adds predetermined time to the focus positions converted into the histogram and smoothes the focus positions, and the first predetermined condition is a condition that a plurality of peaks exceeding a predetermined threshold exist in the smoothed histogram.

(11)

A control method including:

calculating, on a basis of a result of capturing a subject image passed through a focus lens by using an imaging element including a plurality of phase difference detection regions, a focus position of each of the phase difference detection regions; and determining a position of the focus lens on a basis of an average value of the calculated focus positions of the phase difference detection regions falling within a predetermined range from the focus position on an infinity side or macro side.

(12)

A control method including:

calculating, on a basis of a result of capturing a subject image passed through a focus lens by using an imaging element including a plurality of phase difference detection regions, a focus position of each of the phase difference detection regions; and determining a position of the focus lens on a basis of the focus position on an infinity side or macro side if a number of the phase difference detection regions whose focus positions are apart from the focus position in the phase difference detection region serving as a reference by a predetermined range or more, is a predetermined value or more.

(13)

A control method including:

calculating, on a basis of a result of capturing a subject image passed through a focus lens by using an imaging element including a plurality of phase difference detection regions, a focus position of each of the phase difference detection regions and converting the focus positions into a histogram; and determining a position of the focus lens on a basis of the focus position on an infinity side or macro side in a case where each of the focus positions of the phase difference detection regions converted into the histogram satisfies a first predetermined condition.

(14)

A computer program for causing a computer execute calculating, on a basis of a result of capturing a subject image passed through a focus lens by using an imaging element including a plurality of phase difference detection regions, a focus position of each of the phase difference detection regions, and determining a position of the focus lens on a basis of an average value of the calculated focus positions of the phase difference detection regions falling within a predetermined range from the focus position on an infinity side or macro side.

(15)

A computer program for causing a computer execute calculating, on a basis of a result of capturing a subject image passed through a focus lens by using an imaging element including a plurality of phase difference detection regions, a focus position of each of the phase difference detection regions, and determining a position of the focus lens on a basis of the focus position on an infinity side or macro side if a number of the phase difference detection regions whose focus positions are apart from the focus position in the phase difference detection region serving as a reference by a predetermined range or more, is a predetermined value or more.

(16)

A computer program for causing a computer execute calculating, on a basis of a result of capturing a subject image passed through a focus lens by using an imaging element including a plurality of phase difference detection regions, a focus position of each of the phase difference detection regions and converting the focus positions into a histogram, and determining a position of the focus lens on a basis of the focus position on an infinity side or macro side in a case where each of the focus positions of the phase difference detection regions converted into the histogram satisfies a first predetermined condition.

(17)

An electronic device including:

an imaging optical system configured to collect light;

an imaging element configured to receive light from the imaging optical system and capture an image; and a signal processing unit configured to process a signal output by the imaging element, in which the signal processing unit includes a calculation unit configured to calculate, on a basis of a result of capturing a subject image passed through a focus lens by using the imaging element including a plurality of phase difference detection regions, a focus position of each of the phase difference detection regions, and a determination unit configured to determine a position of the focus lens on a basis of an average value of the focus positions of the phase difference detection regions calculated by the calculation unit and falling within a predetermined range from the focus position on an infinity side or macro side.

(18)

An electronic device including:

an imaging optical system configured to collect light;

an imaging element configured to receive light from the imaging optical system and capture an image; and a signal processing unit configured to process a signal output by the imaging element, in which the signal processing unit includes a calculation unit configured to calculate, on a basis of a result of capturing a subject image passed through a focus lens by using the imaging element including a plurality of phase difference detection regions, a focus position of each of the phase difference detection regions, and a determination unit configured to determine a position of the focus lens on a basis of the focus position on an infinity side or macro side if a number of the phase difference detection regions whose focus positions are apart from the focus position of the phase difference detection region serving as a reference by a predetermined range or more, is a predetermined value or more.

(19)

An electronic device including:

an imaging optical system configured to collect light;

an imaging element configured to receive light from the imaging optical system and capture an image; and a signal processing unit configured to process a signal output by the imaging element, in which the signal processing unit includes a calculation unit configured to calculate, on a basis of a result of capturing a subject image passed through a focus lens by using the imaging element including a plurality of phase difference detection regions, a focus position of each of the phase difference detection regions and convert the focus positions into a histogram, and a determination unit configured to determine a position of the focus lens on a basis of the focus position on an infinity side or macro side in a case where each of the focus positions of the phase difference detection regions converted into the histogram satisfies a first predetermined condition.

REFERENCE SIGNS LIST 11 lens barrel
11A imaging optical system 12 optical filter
13 image sensor
14 main processing unit
15 illumination control unit
16 sensor drive unit
17 phase detection AF processing unit
18 image processing unit
19 focus drive unit
20 display unit
21 operation unit
22 flash memory
31 CPU
32 memory
33 ADC
34 DAC
35 communication I/F
50 light receiving surface
51 pixel block
52 normal pixel
53 detection pixel
53L left light-shielding pixel
53R right light-shielding pixel
61 PD
62 CL
63 color filter
64 on-chip lens
66 light-shielding film

The invention claimed is:

1. A control device, comprising:
a calculation unit configured to calculate a focus position of each phase difference detection region of a plurality of phase difference detection regions of a subject image based on a result of capture of the subject image, wherein the subject image is captured by an imaging element via a focus lens; and
a determination unit configured to:
  determine whether a number of phase difference detection regions, whose focus positions is within a specific range, in a set of phase difference detection regions of the plurality of phase difference detection regions is greater than or equal to a specific threshold; and
  determine a position of the focus lens based on:
    the determination that the number of phase difference detection regions in the set of phase difference detection regions is greater than or equal to the specific threshold, and
    an average value of the calculated focus position of each phase difference detection region of the plurality of phase difference detection regions, wherein the average value is within a specific range, on an infinity side or macro side, from the focus position.

2. The control device according to claim 1, wherein each phase difference detection region of the plurality of phase difference detection regions includes a first region and a plurality of second regions, and
at least a part of each second region of the plurality of second regions overlaps with the first region.

3. A control device, comprising:
a calculation unit configured to calculate a focus position of each phase difference detection region of a plurality of phase difference detection regions of a subject image based on a result of capture of the subject image, wherein the subject image is captured by an imaging element via a focus lens; and
a determination unit configured to:
  determine whether a number of phase difference detection regions of the plurality of phase difference detection regions is greater than or equal to a specific threshold, wherein focus positions of the number of phase difference detection regions are apart from the focus position of a reference phase difference detection region of the plurality of phase difference detection regions by greater than or equal to a specific range; and
  determine a position of the focus lens based on:
    the determination that the number of the phase difference detection regions is greater than or equal to the specific threshold; and
    the focus position on an infinity side or macro side.

4. A control method, comprising:
calculating a focus position of each phase difference detection region of a plurality of phase difference detection regions of a subject image based on a result of capture of the subject image,
  wherein the subject image is captured by an imaging element via a focus lens;
determining whether a number of phase difference detection regions, whose focus positions is within a specific range, in a set of phase difference detection regions of the plurality of phase difference detection regions is greater than or equal to a specific threshold; and
determining a position of the focus lens based on:
  the determination that the number of phase difference detection regions in the set of phase difference detection regions is greater than or equal to the specific threshold, and
  an average value, of the calculated focus position of each phase difference detection region of the phase difference detection regions, being within a specific range, on an infinity side or macro side, from the focus position.

5. A control method, comprising:
calculating a focus position of each phase difference detection region of a plurality of phase difference detection regions of a subject image based on a result of capture of the subject image,
  wherein the subject image is captured by an imaging element via a focus lens;
determining whether a number of phase difference detection regions of the plurality of phase difference detection regions is greater than or equal to a specific threshold, wherein focus positions of the number of phase difference detection regions are apart from the focus position of a reference phase difference detection region of the plurality of phase difference detection regions by greater than or equal to a specific range; and
determining a position of the focus lens based on:
  the determination that the number of the phase difference detection regions is greater than or equal to the specific threshold; and
  the focus position, on an infinity side or macro side, of each phase difference detection region of the plurality of phase difference detection regions.

6. A non-transitory computer-readable medium having stored thereon, computer-executable instructions which, when executed by a computer, cause the computer to execute operations, the operations comprising:
calculating a focus position of each phase difference detection region of a plurality of phase difference detection regions of a subject image based on a result of capture of the subject image, wherein the subject image is captured by an imaging element via a focus lens;

determining whether a number of phase difference detection regions, whose focus positions is within a specific range, in a set of phase difference detection regions of the plurality of phase difference detection regions is greater than or equal to a specific threshold; and determining a position of the focus lens based on:
the determination that the number of phase difference detection regions in the set of phase difference detection regions is greater than or equal to the specific threshold, and
an average value, of the calculated focus position of each phase difference detection region of the phase difference detection regions, being within a specific range, on an infinity side or macro side, from the focus position.

7. A non-transitory computer-readable medium having stored thereon, computer-executable instructions which, when executed by a computer, cause the computer to execute operations, the operations comprising:

calculating a focus position of each phase difference detection region of a plurality of phase difference detection regions of a subject image based on a result of capture of the subject image,
wherein the subject image is captured by an imaging element via a focus lens;

determining whether a number of phase difference detection regions of the plurality of phase difference detection regions is greater than or equal to a specific threshold, wherein focus positions of the number of phase difference detection regions are apart from the focus position of a reference phase difference detection region of the plurality of phase difference detection regions by greater than or equal to a specific range; and determining a position of the focus lens based on:
the determination that the number of the phase difference detection regions is greater than or equal to the specific threshold; and
the focus position, on an infinity side or macro side, of each phase difference detection region of the plurality of phase difference detection regions.

8. An electronic device comprising:
an imaging optical system configured to collect light;
an imaging element configured to:
receive the light from the imaging optical system: and
capture a subject image based on the received light; and
a signal processing unit configured to process a signal output by the imaging element,
wherein the signal processing unit includes:
a calculation unit configured to calculate a focus position of each phase difference detection region of a plurality of phase difference detection regions of the subject image based on a result of the capture of the subject image,
wherein the subject image is captured by the imaging element via a focus lens; and
a determination unit configured to:
determine whether a number of phase difference detection regions, whose focus positions is within a specific range, in a set of phase difference detection regions of the plurality of phase difference detection regions is greater than or equal to a specific threshold; and
determine a position of the focus lens based on:
the determination that the number of phase difference detection regions in the set of phase difference detection regions is greater than or equal to the specific threshold, and
an average value of the calculated focus position of each phase difference detection region of the plurality of phase difference detection regions,
wherein the average value is within a specific range, on an infinity side or macro side, from the focus position.

9. An electronic device, comprising:
an imaging optical system configured to collect light;
an imaging element configured to:
receive the light from the imaging optical system; and
capture a subject image based on the received light; and
a signal processing unit configured to process a signal output by the imaging element,
wherein the signal processing unit includes:
a calculation unit configured to calculate a focus position of each phase difference detection region of a plurality of phase difference detection regions of the subject image based on a result of the capture of the subject image,
wherein the subject image is captured by the imaging element via a focus lens; and
a determination unit configured to:
determine whether a number of phase difference detection regions of the plurality of phase difference detection regions is greater than or equal to a specific threshold, wherein focus positions of the number of phase difference detection regions are apart from the focus position of a reference phase difference detection region of the plurality of phase difference detection regions by greater than or equal to a specific range; and
determine a position of the focus lens based on:
the determination that the number of the phase difference detection regions is greater than or equal to the specific threshold; and
the focus position on an infinity side or macro side.

* * * * *